United States Patent
Ziemba et al.

(10) Patent No.: US 10,339,818 B2
(45) Date of Patent: Jul. 2, 2019

(54) DRONE DEFENSE SYSTEM

(71) Applicant: Drone Go Home, LLC, Highlands, NJ (US)

(72) Inventors: Linda J. Ziemba, Highlands, NJ (US); Dennis J. Ziemba, Highlands, NJ (US); Taylor J. Sinatra, Piscataway, NJ (US); Ziang Gao, North Brunswick, NJ (US)

(73) Assignee: DRONE GO HOME, LLC, Highlands, NJ (US)

( * ) Notice: Subject to any disclaimer, the term of this patent is extended or adjusted under 35 U.S.C. 154(b) by 7 days.

(21) Appl. No.: 15/358,574

(22) Filed: Nov. 22, 2016

(65) Prior Publication Data
US 2017/0148332 A1 May 25, 2017

Related U.S. Application Data

(60) Provisional application No. 62/259,163, filed on Nov. 24, 2015.

(51) Int. Cl.
*G08G 5/00* (2006.01)
*H04W 76/10* (2018.01)
(Continued)

(52) U.S. Cl.
CPC .......... *G08G 5/0069* (2013.01); *G08G 5/006* (2013.01); *G08G 5/0013* (2013.01);
(Continued)

(58) Field of Classification Search
None
See application file for complete search history.

(56) References Cited

U.S. PATENT DOCUMENTS

| 8,886,459 B2* | 11/2014 | Stefani | G01C 21/00 |
| | | | 701/120 |
| 9,279,880 B2 | 3/2016 | McCorkle | |

(Continued)

FOREIGN PATENT DOCUMENTS

| EP | 2781980 A1 | 9/2014 |
| RU | 2343530 C1 | 1/2009 |

OTHER PUBLICATIONS

"Ardronis", <https://www.rohde-schwarz.com/us/products/monitoring-and-network-testing/ardronis/pg_overview_230808.html> (accessed Mar. 24, 2017).

(Continued)

*Primary Examiner* — Jonathan M Dager
(74) *Attorney, Agent, or Firm* — Gearhart Law, LLC

(57) ABSTRACT

A drone defense system (DDS) beacon detects unmanned aerial systems (UAS) traffic and transmits a broadcast signal over a transmission region indicating a no-fly zone in which only UAS having an authorization are allowed to fly. The beacon allows UAS with clearance to enter the no-fly zone. Those UAS without clearance are diverted around the no-fly zone, denied Wi-Fi and/or RF connection, forced to return to home launch sites via activation of standard preprogrammed Return to Home (RTH) routines, or forced to land at specified locations where they may be captured. Military, emergency medical services (EMS), and other UAS are allowed to enter no-fly zones in which other UAS, such as commercial, or consumer UAS, cannot enter. DDS cloud collects and stores log data from all deployed DDS beacons. DDS cloud can send system software updates to DDS beacons, make real-time statistical analysis, and provide report data to outside systems.

4 Claims, 26 Drawing Sheets

(51) Int. Cl.
*H04B 1/713* (2011.01)
*H04K 3/00* (2006.01)
*H04W 4/021* (2018.01)
*H04W 12/04* (2009.01)
*H04W 12/06* (2009.01)

(52) U.S. Cl.
CPC ......... *G08G 5/0026* (2013.01); *G08G 5/0039* (2013.01); *H04B 1/713* (2013.01); *H04K 3/92* (2013.01); *H04W 4/021* (2013.01); *H04W 12/04* (2013.01); *H04W 12/06* (2013.01); *H04W 76/10* (2018.02)

(56) References Cited

U.S. PATENT DOCUMENTS

| | | | | |
|---|---|---|---|---|
| 9,529,360 | B1* | 12/2016 | Melamed | G05D 1/0022 |
| 9,621,850 | B1* | 4/2017 | Mitchell | H04N 7/15 |
| 9,805,238 | B2* | 10/2017 | Falk | G06K 7/10366 |
| 2004/0249519 | A1* | 12/2004 | Frink | B64D 45/0015 701/3 |
| 2007/0018052 | A1* | 1/2007 | Eriksson | G05D 1/0044 244/190 |
| 2007/0032246 | A1* | 2/2007 | Feher | H04W 64/00 455/456.1 |
| 2007/0252748 | A1* | 11/2007 | Rees | H01Q 1/28 342/29 |
| 2009/0210109 | A1* | 8/2009 | Ravenscroft | G01C 21/005 701/26 |
| 2010/0085236 | A1* | 4/2010 | Franceschini | G01S 13/765 342/30 |
| 2010/0286859 | A1* | 11/2010 | Feigh | G05D 1/0044 701/25 |
| 2011/0057830 | A1* | 3/2011 | Sampigethaya | G01S 5/0072 342/36 |
| 2012/0158280 | A1* | 6/2012 | Ravenscroft | G01C 21/005 701/400 |
| 2014/0102288 | A1 | 4/2014 | Yeshurun et al. | |
| 2014/0371952 | A1* | 12/2014 | Ohtomo | B64C 39/024 701/2 |
| 2015/0254988 | A1* | 9/2015 | Wang | G05D 1/0214 701/3 |
| 2015/0301150 | A1* | 10/2015 | Stuckman | G01S 1/00 342/407 |
| 2016/0117931 | A1* | 4/2016 | Chan | G08G 5/0043 701/120 |
| 2016/0225264 | A1* | 8/2016 | Taveira | B64C 39/024 |
| 2016/0240087 | A1* | 8/2016 | Kube | G08G 5/006 |
| 2016/0245907 | A1* | 8/2016 | Parker | F41H 11/02 |
| 2016/0253907 | A1* | 9/2016 | Taveira | G08G 5/006 701/3 |
| 2016/0291589 | A1* | 10/2016 | Ashoori | G01S 19/13 |
| 2016/0370800 | A1* | 12/2016 | Chau | G05D 1/0088 |
| 2016/0375779 | A1 | 12/2016 | Wang | |
| 2017/0018113 | A1 | 1/2017 | Lattanzi et al. | |
| 2017/0053169 | A1 | 2/2017 | Cuban et al. | |
| 2017/0057634 | A1* | 3/2017 | Hunt | B64C 39/024 |
| 2017/0061632 | A1 | 3/2017 | Lindner et al. | |
| 2017/0063454 | A1 | 3/2017 | Urcia et al. | |
| 2017/0064332 | A1 | 3/2017 | Lin et al. | |
| 2017/0086159 | A1 | 3/2017 | Ameixiera | |
| 2017/0183074 | A1* | 6/2017 | Hutson | B64C 1/061 |
| 2017/0192421 | A1* | 7/2017 | Vega | G05D 1/0022 |
| 2017/0234724 | A1* | 8/2017 | Naguib | G01H 3/08 367/117 |
| 2017/0234966 | A1* | 8/2017 | Naguib | G01S 5/22 367/117 |
| 2017/0235316 | A1* | 8/2017 | Shattil | B64C 39/024 701/3 |
| 2017/0255194 | A1* | 9/2017 | Poornachandran | B64C 39/024 |
| 2017/0255802 | A1* | 9/2017 | Falk | G06K 7/10366 |
| 2017/0270803 | A1* | 9/2017 | High | B64C 39/02 |
| 2017/0277176 | A1* | 9/2017 | Hutson | G05D 1/0016 |
| 2017/0337826 | A1* | 11/2017 | Moran | G01S 1/042 |
| 2018/0046180 | A1* | 2/2018 | Falk | B64C 39/00 |
| 2018/0081355 | A1* | 3/2018 | Magy | F41H 13/00 |
| 2018/0086483 | A1* | 3/2018 | Priest | G08G 5/0069 |
| 2018/0157255 | A1* | 6/2018 | Halverson | B64C 39/024 |
| 2018/0211263 | A1* | 7/2018 | Gong | G06F 16/29 |
| 2018/0211547 | A1* | 7/2018 | Cui | G08G 5/006 |

OTHER PUBLICATIONS

"Aaronia Drone Detection System", <http://www.aaronia.com/products/solutions/aaronia-drone-detection-system> (accessed Mar. 24, 2017).

"Corporate Espionage and Harassment of Executives Can Be Stopped with Drone Detector®", <http://www.dronedetector.com/corporate-security/> (accessed Mar. 24, 2017).

"Counter-UAS Systems", <http://www.srcinc.com/what-we-do/ew/counter-uas.aspx> (accessed Mar. 24, 2017).

"Skylight Solution", <http://gryphonsensors.com/wp-content/uploads/2016/09/Skylight-2-13-17.pdf> (accessed Mar. 24, 2017).

"D3T: Drone Detection and Defeat Technology", <http://cellantenna.com/index.php?id=d3t> (accessed Mar. 24, 2017).

Gabriel C. Birch et al., "UAS Detection, Classification, and Neutralization: Market Survey 2015", Sandia Report, Published 2015 in U.S.A. by U.S. Department of Commerce—National Technical Information Service.

International Search Report and Written Opinion corresponding to PCT/US2016/063327 dated Apr. 13, 2017, 7 pages.

* cited by examiner

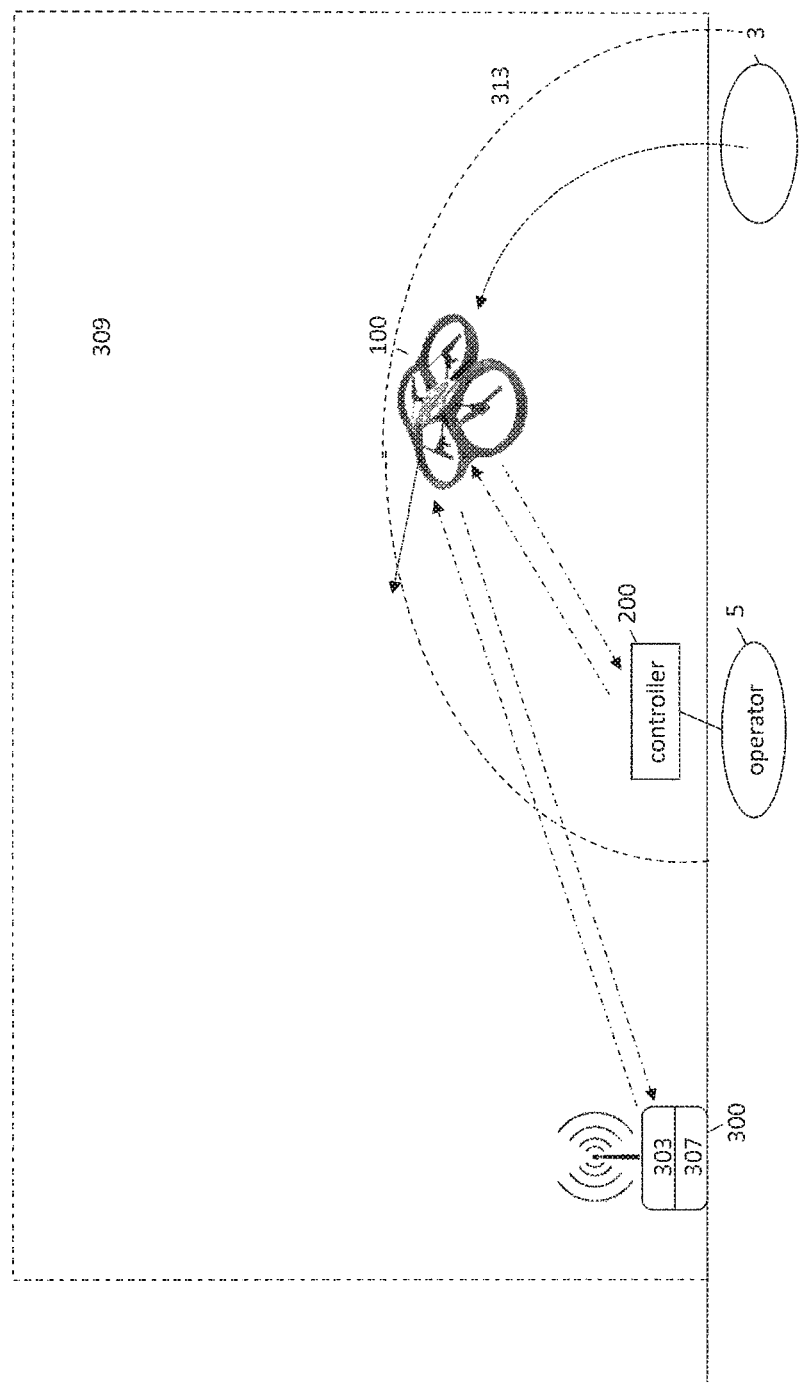

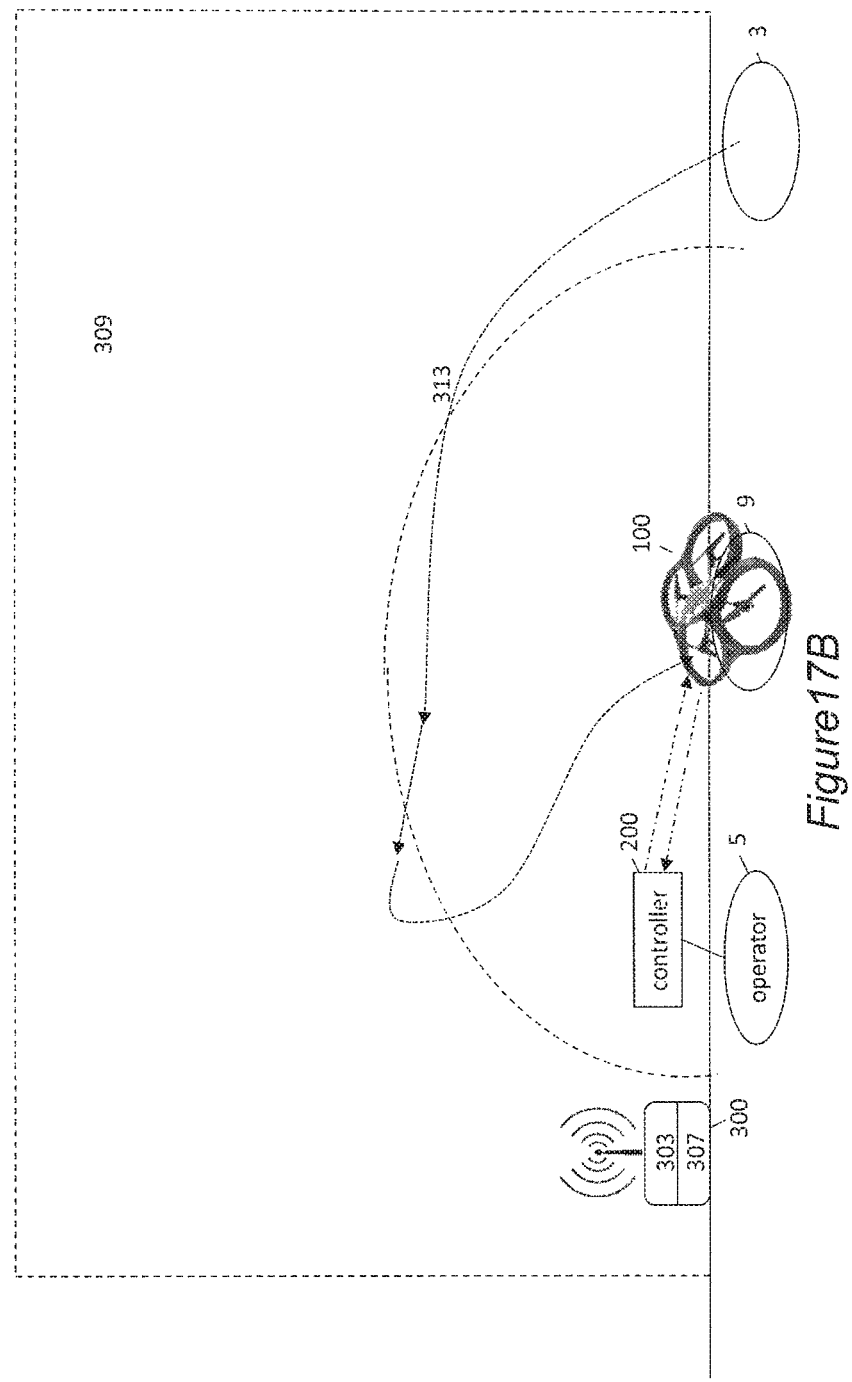

DRONE DEFENSE SYSTEM

CLAIM OF PRIORITY

This application claims priority to U.S. application Ser. No. 62/259,163 filed on Nov. 24, 2015, the contents of which are herein fully incorporated by reference in its entirety.

FIELD OF THE EMBODIMENTS

The present invention and its embodiments relate to a system that prevents unmanned aerial systems (UAS) from flying into a defined airspace, and more specifically to a system that prevents UAS not having a proper authorization or priority from flying into permanently or temporarily defined airspace.

BACKGROUND OF THE EMBODIMENTS

Small, sophisticated unmanned aerial systems ("UAS") are rapidly entering the mass-market hobbyist and commercial markets in significant numbers because nearly any amateur can pilot. This rapid growth of the consumer and commercial UAS market raises security and privacy concerns.

In at least five fires during July 2015 in California, fire aircraft dispatched to drop chemicals or water had to adjust its course due to interference with a UAS. Numerous UAS have been seen flying near major US airports such as Newark Liberty International and John F. Kennedy International Airports in the NY metro area causing serious concern for risk of a catastrophic mid-air collision.

Sep. 4, 2015, another hobbyist pilot was arrested, according to the New York Police Department, when he accidentally crashed his UAS into the Louis Armstrong Stadium, during the United States Tennis Association Open Tournament.

Yet another small UAS hobbyist in Washington D.C. accidentally crashed a UAS on the lawn of the White House.

The statutory parameters of a model aircraft operation are outlined in Section 336 of Public Law 112-95 (the Federal Aviation Administration (FAA) Modernization and Reform Act of 2012). Individuals who fly within the scope of these parameters do not require permission to operate their UAS; any flight outside these parameters (including any non-hobby, non-recreational operation) requires FAA authorization. An estimated 700,000-1,000,000 consumer hobbyist drones will be sold in the United States in 2015 alone.

The FAA has had more than three years to meet the Sep. 30, 2015 deadline for full integration, yet the agency has not yet completed rules defining a small unmanned aerial system ("UAS"). Prior to the finalization of the Small UAS Rule, the FAA is granting exceptions on case-by-case authorization for certain unmanned aircraft to perform commercial operations. The approved exceptions increased from eight (8) from July-December 2014 to 1724 through September 2015, indicating the number of UAS in use is increasing exponentially.

Senate Bill S. 1608, The Consumer Drone Safety Act proposed by Senators Diane Feinstein (CA-D) and Charles Schumer (NY-R) on Jun. 18, 2015 to protect the safety of the national airspace system from the hazardous operation of consumer drones, and for other purposes. Among several things, the bill calls for a technological means to maintain safety in the event that a communications link between a consumer drone and its operator is lost or compromised, such as by ensuring that the drone autonomously lands safely in a particular location. This feature is present in some of today's UAS and is commonly known as Return to Home (RTH) or Return to Launch (RTL).

Bill S. 1608 also requires that a consumer drone be detectable and identifiable to pilots and air traffic controllers, including the use of an identification number and a transponder or similar technology to convey the drone's location and altitude. The additional requirement of a means to prevent tampering with or modification of any system, limitation, or other safety mechanism required by the Administrator ensures these capabilities will be on consumer drones.

Some current systems to defend against unauthorized UAS are based on detection, determination of intent and disablement or destruction of an offending UAS. There are numerous issues with this approach, the most important being risk of injury or death as a result of collateral damage to humans and property from a disabled or destroyed drone. There are also legal questions regarding who is allowed to disable damage or destroy an offending UAS.

Some attempts focus extensively on detecting UAS presence through numerous multi-sensor methods and when detected, alerting the property owner of UAS presence, whether friendly or threatening. Generally, these solutions do not propose methods to manually or automatically prevent UAS from entering the property. Some require manual intervention for threat remediation from UAS causing the property owner to require trained staff 24×7 to protect the property.

Other current defense systems are based on "no-fly" zone coordinates loaded onto the drone firmware. These 'no-fly zones' can be updated constantly. It is unclear how the small drone manufacturers will keep this updated and how hobbyists will be required to update their drones. This approach will not address 'no-fly zones' that are temporarily set up for situations such as aerial firefighting, general emergency situations, on-location movie filming, parades or other mass audience events.

Attempts have been made to reduce the problems with UAS. For example, U.S. 2015/0254988 A1, Sep. 10, 2015, Wang et al. "Flight Control for Flight-Restricted Regions" pertains to restricted areas, unmanned vehicles and a means to determine when the unmanned vehicles are within the restricted areas. It employs the use of GPS for the UAS's location and have prestored coordinates of restricted areas. This system is for restricted areas that are loaded on the UAS. It cannot detect or determine restricted areas that have been set up since this information was last updated on the UAS. It does not have interactive capabilities to know of temporary no-fly zones as they are created and or deleted.

Also, since Wang '988 relies upon downloads, it is difficult for a system according to Wang's description to accurately identify no-fly zones which are not stationery. These may be moving no-fly zones.

The device of US 2007/0018052 A1, Jan. 25, 2007 by Eriksson "A System and Method for In-Flight Control of an Aerial Vehicle" pertains to defining the shape and location of space that is not restricted airspace. This defines locations where an UAS is allowed to fly without running into restricted air space. It does not describe system for controlling the UAS to change its course, divert it, or make it land. It also does not address that different UAS may be allowed into different no-fly zones.

U.S. Pat. No. 8,886,459 B2, Nov. 11, 2014, by Stefani et al. "Systems and Methods for Small Unmanned Aircraft Systems (sUAS) Tactical Tracking and Mission Data Acquisition" pertains to a system to manage the flight paths of small-UAS and integrate the system into the National Airspace Structure. This deals primarily with traffic control and uses methods other than broadcasting the no-fly coordinates to UAS to identify no-fly zones. Stefani does not seem capable of identifying no-fly zones that are mobile.

Currently, there is a need that restricts defined types of unmanned aerial systems from entering into defined airspace at given times/dates.

SUMMARY OF THE EMBODIMENTS

In light of the present need for a Drone Defense System (DDS), a brief summary of various exemplary embodiments is presented. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

Various exemplary embodiments relate to a DDS that prevents UAS without a proper authorization or priority from flying into a permanently or temporarily defined no-fly zone (airspace). The DDS may include: a DDS transponder device to transmit and receive communication with the DDS transponder or transponder built into the UAS (native) on an UAS; a computing device to store and process the DDS logic and software.

In various embodiments, the system may be implemented as a mobile version for use on vehicles or aircraft or a permanently mounted version for deployment at buildings or outdoor structures.

In various embodiments, the DDS transponder may be configured to transmit to a variable maximum transmission distance. The transponder can be configured to be operational at all times, or at prescheduled times. It can also be manually activated/deactivated.

In various embodiments, the transponder transmission region may be configured to have various shapes that may approximate a square, circle or n-sided polygon shape. Transponders may be linked together to increase the transmission region.

In various embodiments, the transponder may be configured to allow a UAS that communicates a verified authorization key to fly into the no-fly zone. This is advantageous when a stadium wishes to allow one photographer's UAS to fly but no others or when a movie production company wants to only allow their UAS to be allowed to fly over a filming location and no other UAS.

In various embodiments, the DDS may allow a UAS to fly within the no-fly zone when the UAS presents an Emergency Management Services (EMS) or other priority identification.

Various exemplary embodiments relate to the receiver on the UAS or drone controller. The preferred embodiment is to communicate directly with the firmware on the DDS hardware on the UAS creating a closed loop security system, requiring hardware and software on UAS allowed to fly in a DDS no-fly zone. This "multi-factor" authentication of something you have (chip on the UAS) and something you know (authorization key) being required to enter a no-fly zone may be preferable from a security perspective.

In various embodiments, the authorization key may be a static alpha-numeric string. Alternatively, it may be a randomly generated alpha-numeric string for more secure deployments.

In various embodiments, the UAS communication from the DDS transponder may be to the native transponder on the UAS. The latter embodiment enables UAS that have no DDS presence onboard to be blocked from entering a no-fly zone.

In various embodiments, the transmission region is larger than and encompasses the no-fly zone. This allows a warning message to be sent to the UAS pilot via the operator controller, allowing the operator to quickly change direction before entering the no-fly zone.

In various embodiments, the system may function to activate the RTH feature of UAS models supporting this feature. The system may redirect the UAS to its launch location or a pre-configured safe landing zone, enabling proper authorities to retrieve the UAS for further inspection. Alternatively, the system may function to cause the planned air traffic control system to forward a revised flight plan to UAS with registered flight plans.

In various embodiments, the system may store, locally or through a network, information gathered about UAS, including but not limited to, their ID, owner information, telemetry information, or any other information available. These stored data can then be shared used locally, with an internal system, or with an external system via a network connection. For example, these data may include but are not limited to statistical analysis of UAS density or UAS intrusion rate.

In various embodiments, the invention includes a limited-fly zone. In one embodiment, this zone may be handled the same way as a no-fly zone except in certain scenarios. One scenario may include a UAS with DDS software onboard and separate GPS locator chip and transmitter located in a wristband. In this scenario, the UAS will be allowed to fly within the limited-fly zone as long as it remains within a certain configurable distance of the wristband. If the UAS is outside of this maximum distance, the DDS will initiate preprogrammed flight routes such as RTL or a location specified by the GPS coordinates of the wristband. This can be thought of in the sense of a virtual tether keeping the UAS within a certain tether length.

In one embodiment of the present invention there is a DDS comprising: a beacon configured to send and receive signals within a predefined geographic locale; and a computing device communicatively coupled to the beacon, the computing device having a computer program embodied in a non-transitory computer-readable medium comprising computer readable instructions, which when executed by a processor, cause the processor to perform the steps of: broadcasting, via the beacon, parameters of a no-fly zone; establishing a communication link between a UAS and the beacon; determining, by the processor, if the UAS is authorized to enter the no-fly zone, wherein if the UAS is authorized to enter the no-fly zone, then the DDS monitors a location of the UAS while it is within the no-fly zone, and wherein if the UAS is not authorized to enter the no-fly zone, then a determination is made by the processor as to a security level of the no-fly zone, wherein the processor further determines if the UAS has an operating system configured to receive a signal from a DDS; and wherein when the UAS has entered the no-fly zone, the DDS is configured to disrupt the communication link between the UAS and its controller by sending of a second signal to the UAS or a controller of the UAS or a combination thereof.

In yet another embodiment of the present invention there is a method of using a DDS to control access by a UAS to a no-fly zone, the method comprising the steps of: broadcasting, from a beacon located in the no-fly zone, parameters of the no-fly zone; establishing a communication link between the UAS and the beacon; determining, at the beacon, if the UAS is authorized to enter the no-fly zone, and if so, the DDS monitors a location of the UAS while it is within the parameters of the no-fly zone; if the UAS is not authorized to enter the no-fly zone, then a determination is made by the processor as to a security level of the no-fly zone, and the processor further determines if the UAS has an operating system configured to receive signal from the DDS; and wherein the UAS is inside the no-fly zone, the DDS is configured to disrupt the communication link between the UAS and its controller by sending of a second signal.

In yet another embodiment of the present invention there is a method of using a DDS to control access by a UAS to a no-fly zone, the method comprising the steps of: broadcasting from a beacon located in the no-fly zone, an indication of the no-fly zone and the coordinates of the no-fly zone; establishing a communication link between the UAS and the beacon; determining at the beacon if the UAS is authorized to enter the no-fly zone by using a prestored authorization key, and if so, the beacon monitors a location of the UAS while the UAS is in the no-fly zone; wherein if the UAS is not authorized to enter the no-fly zone, then a determination is made by the beacon if the no fly zone is a high security level zone, and if the UAS has compatible software on board and is operational; wherein if the UAS is in the high security level zone, and has compatible software on board, then a preprogrammed landing routine is initiated by a command from the beacon causing the UAS to land at a landing site for capture; wherein if the UAS is in the high security zone, and does not have compatible software on board, then a set of RF commands are sent from the beacon causing it to initiate a preprogrammed landing routine to fly the UAS to an original launch site and land; wherein if the UAS is not in the high security zone, and has compatible software on board, then a preprogrammed landing routine is initiated by a command from the beacon causing the UAS to fly to its original launch site and land; wherein if the UAS is not in the high security zone, and does not have compatible software on board, then a set of RF commands are sent from the beacon causing the UAS to fly to its original launch site and land; and wherein if the UAS is inside the no-fly zone the DDS is configured to disrupt the communication link between UAS and its controller by constantly sending LoC signals.

BRIEF DESCRIPTION OF THE DRAWINGS

It will be appreciated that the illustrated boundaries of elements in the drawings represent only one example of the boundaries. One skilled in the art will appreciate that a single element may be designed as multiple elements or that multiple elements may be designed as a single element. An element shown as an internal feature may be implemented as an external feature and vice versa.

Further, in the accompanying drawings and description that follows, like parts are indicated throughout the drawings and description with the same reference numerals, respectively. The figures may not be drawn to scale and the proportions of certain parts have been exaggerated for convenience of illustration.

FIG. 16A is a schematic diagram of the no-fly zone of the system of FIG. 1 in which the UAS is allowed to fly in a no-fly zone within a limited-fly zone.

FIG. 17B shows the UAS of FIG. 17B has been returned to a point near the operator controller.

DESCRIPTION OF THE PREFERRED EMBODIMENTS

Figure 1:
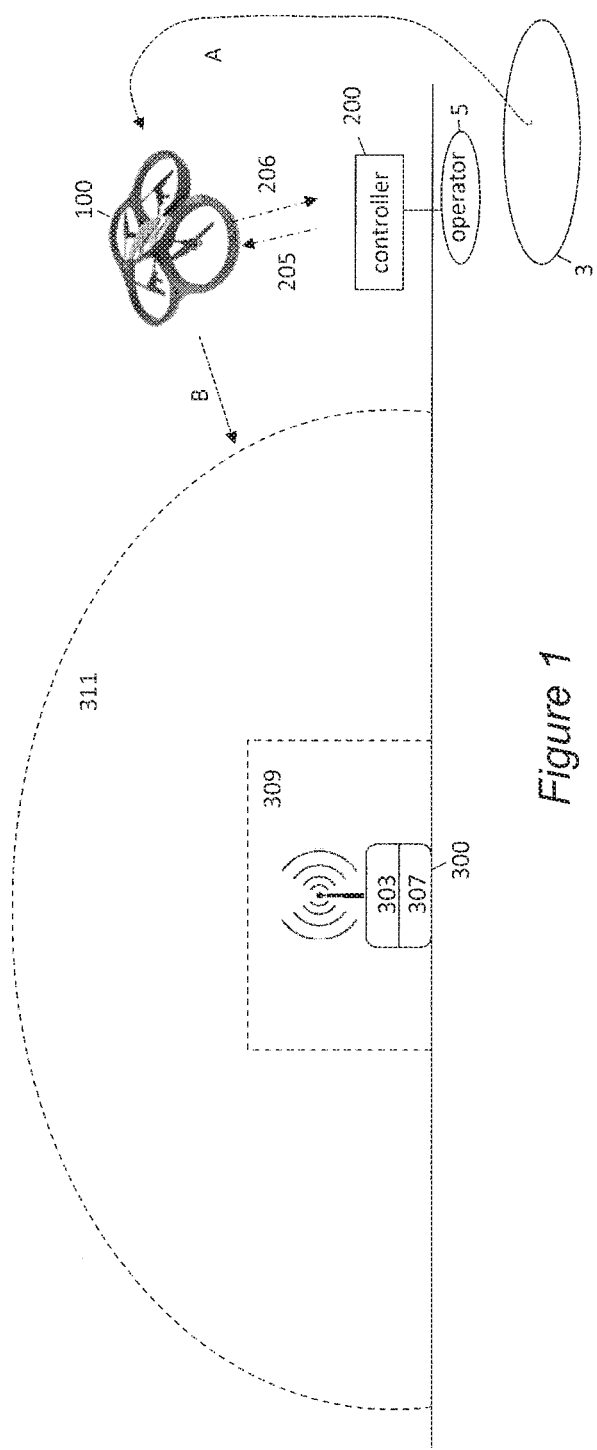
FIG. 1 is a schematic diagram of a system in which an operator is flying an unmanned aerial system (UAS) toward a restricted airspace ('no-fly zone').

The preferred embodiments of the present invention will now be described with reference to the drawings. Identical elements in the various figures are identified with the same reference numerals.

Reference will now be made in detail to each embodiment of the present invention. Such embodiments are provided by way of explanation of the present invention, which is not intended to be limited thereto. In fact, those of ordinary skill in the art may appreciate upon reading the present specification and viewing the present drawings that various modifications and variations can be made thereto.

In view of the foregoing, it would be advantageous to provide a way to utilize a DDS to control in real-time which small UAS (drones) may fly in particular airspace, at a given time/date. This would cover both airspace, which is permanently defined, and airspace that is temporarily defined. Different zones/time periods are defined for UAS having different priorities. For example, a firefighting UAS would have a priority rating assigned to it allowing it to fly into a zone around a fire that would be restricted to other UAS not having the same priority assignments. A news reporting UAS may have another priority and be restricted to a zone a distance away from the fire outside of the airspace defined for the firefighting UAS.

The zones may change with time, such that the news reporting UAS may then be allowed closer to the fire scene just after the fire is extinguished. The designation of restricted airspace may be totally removed after it is determined that normal air traffic may continue around the site.

Referring now to the invention, in FIG. 1 an UAS 100 has started at a launch site 3 and is being flown and controlled by an operator 5 using an operator controller 200. Controller 200 communicates with the UAS 100 via a radio uplink channel 205 and receives information back from the UAS on a radio downlink channel 206. In certain types of communications, the uplink and downlink can be on different dedicated frequencies. In others, they may share the same frequency. Most conventional UAS currently communicate on a band centered at 2.4 GHz or 1.3 GHz radio frequencies (RF), for the purpose of this patent RF will be used interchangeably with any known communication method such as but not limited to Wi-Fi®. A limited number are using a band centered at 5.8 GHz.

In this figure, the UAS 100 has launched from launch site 3 and has followed the path marked by arrow "A" in a direction marked by arrow "B". A DDS beacon 300 includes a DDS transponder 303 and a DDS computing device 307, which may be configured to transmit a signal within a transmission region 311. The signal may include coordinates of the no-fly zone 309 within the transmission region 311 and/or RTH commands.

The transmission region 311 exceeds the no-fly zone 309 so the DDS beacon 300 has adequate time to establish communications with the UAS 100 before it enters the no-fly zone 309.

Still referring to FIG. 1, the transmission contains coordinates defining the no-fly zone 309 and a priority required to enter this no-fly zone 309. There may be many different priorities assigned to different UAS 100. For example, UAS used by emergency services or first responders may have a security rating letting them into most no-fly zones. Whereas, commercial and consumer UAS would be restricted from these no-fly zones.

Figure 2:
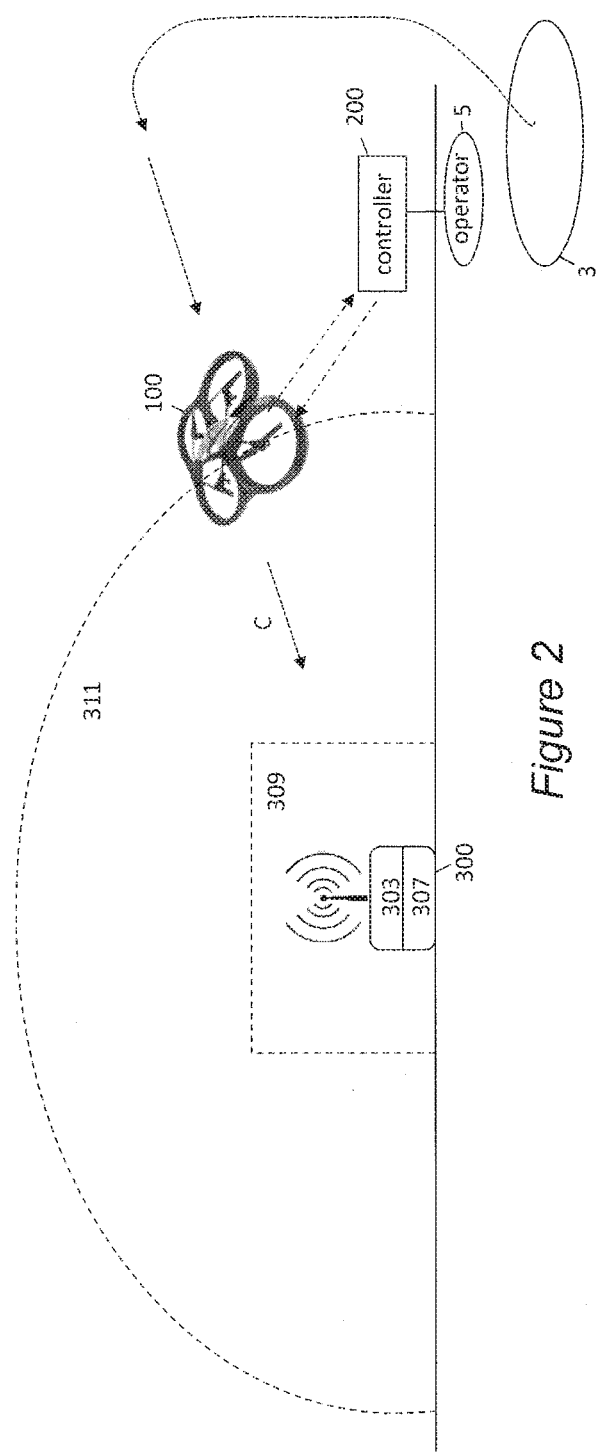
FIG. 2 shows the system of FIG. 1 where the UAS is just entering a transmission region surrounding the 'no-fly zone'.

In FIG. 2, the UAS 100 enters the transmission region 311 heading in a direction of arrow "C" towards the no-fly zone 309. The UAS 100 transmits its coordinates back to controller 200 so that the operator 5 can track the current location of the UAS 100.

At this point, the DDS transponder 303 of beacon 300 also can "hear" communications between the UAS 100 and the controller 200. These signals are processed by a computing device 307 to determine if the UAS 100 is now within the transmission area 311. The computing device 307 may also determine what frequency in which the UAS 100 and operator transponder are communicating, the method of communication, and determining if this is a standard communication method being used.

In an alternative embodiment, computing device 307 may cause DDS beacon 300 to execute several transmission tests to determine if UAS 100 has software developed which is compatible with software in the beacon 300. For example, since the government is mandating certain standards and functionality in UAS, a company may provide software to both the UAS manufacturer and the DDS manufacturer so that both may seamlessly communicate to comply with government standards and to ensure that this system is operational. In the case where compatible software is provided in both the UAS and the DDS, there can be codes which when received by the UAS, cause initiation of preprogrammed functions of the UAS. For example, RTH preprogrammed routine would have navigation software which controls the UAS to fly back to its original launch location.

Similarly, a "land now" routine would find the closest safe landing location and execute a landing. There can also be many different "built-in" preprogrammed routines that perform a number of different functions related to sensing, communicating, reporting, navigating and other functions.

The compatible software, also referred to as "DDS software", used to communicate between the UAS 100 and the beacon 300 may be potentially implemented: 1) as DDS software preloaded onto a DDS chip that is added to the UAS 100; 2) by loading it onto existing chip firmware in the UAS 100; and/or 3) by loading it onto the computing device 307, or beacon 300.

In the alternative embodiment, if the UAS 100 does not have embedded compatible software, the beacon 300 may run various routines to try to determine the frequency used for uplink and downlink communication and the communication and encryption methods/format. First beacon 300 tests for universal standards. If no standards are being used, then the beacon 300 must determine the communications methods and format. This is described in greater detail below.

In more detail, in one embodiment, the beacon 300 will identify the UAS 100 by its unique RF signature. The beacon 300 then attempts to intercept the handshake protocol between the UAS 100 and the operator controller 200. If necessary beacon 300 may take actions to force a handshake to be transmitted, such as, but not limited to, sending the UAS 100 a Loss of Connection (LoC) signal such as malformed packet specifically designed to interrupt connection between the UAS 100 and its controller 200. Once the handshake is intercepted, if the handshake is not encrypted, the beacon 300 transmits the handshake and establishes two-way communication with the UAS 100. Beacon 300 receives information from the UAS 100, for example telemetry, ID, GPS coordinates, and controller information. The beacon 300 then initiates the preprogrammed RTL routine or hand off the control of the UAS 100 to a local controller for manual flight.

In more detail still referring to the invention, if the handshake between UAS 100 and operator controller 200 is encrypted, then beacon 300 will attempt to decrypt using default decryption keys. If beacon 300 fails at decrypting the handshakes it will constantly send UAS 100 RF LoC signals. This constant LoC will initiate the UAS 100 default preprogrammed routines that are typically RTL or hover/land. The UAS 100 may return to operator control when it leaves the transmission region 311 of beacon 300.

In more detail still referring to the invention, if the UAS 100 is analog rather than digital, beacon 300 will send it commands to initiate the preprogrammed flight routines causing it to RTL. If the UAS 100 is out of the beacon 300 range, the operator controller 200 may resume control. If the UAS 100 reenters the beacon 300 no-fly area, the RTL routine is initiated again.

The previous details describing the process to access the communications link is not intended to restrict or specify the only method for accessing the communications as intended in this patent and should not be taken as such.

Figure 3:
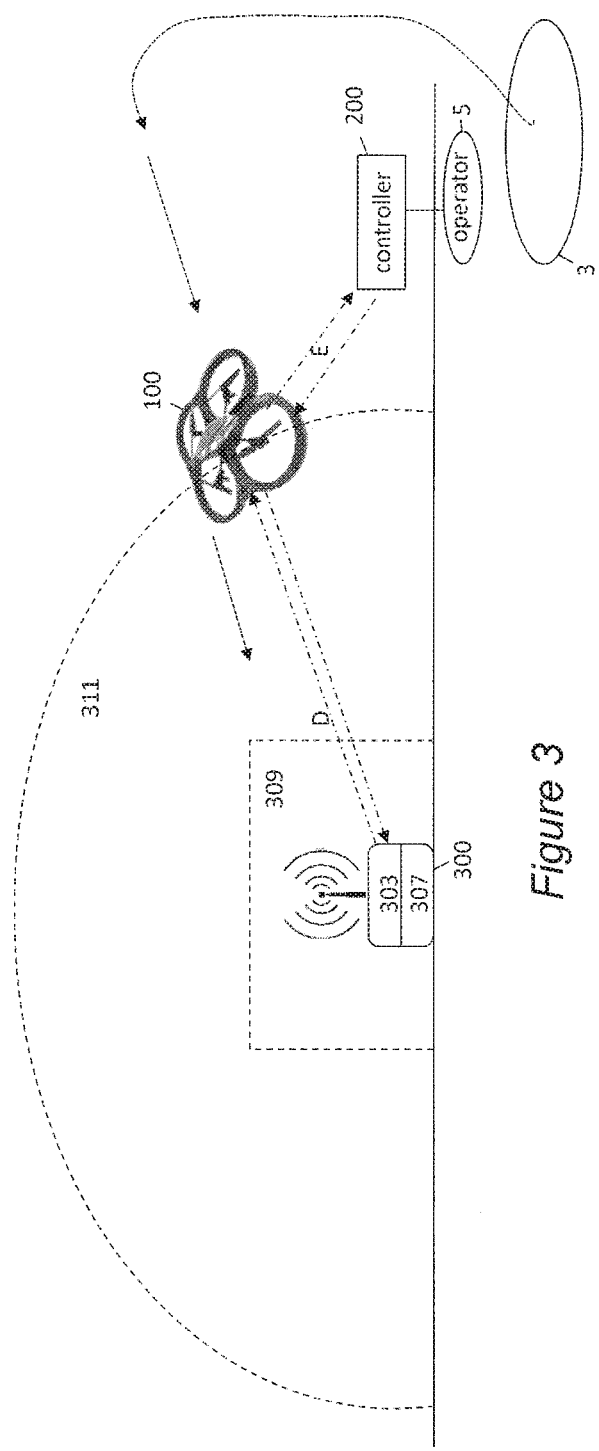
FIG. 3 shows the system of FIG. 1 where the DDS is requesting identification information from the UAS.

In more detail, in FIG. 3, if beacon 300 determines that the UAS 100 is entering the transmission zone 311, beacon 300 sends a warning message to the UAS 100 and optionally the UAS 100 may send the warning message to the controller 200, which notifies the operator 5. If compatible software exists on both the UAS 100 and beacon 300, communication may be on a predetermined radio frequency and format. Optionally, for those that do not have the compatible software, communications may be according to a predetermined standard. Or in an alternative arrangement, communications may be in a Wi-Fi® or radio frequency and method/format determined from analyzing the communications between UAS 100 and controller 200. Communications discussed throughout the remainder of this description will be the same as described above.

The DDS beacon 300 transmits a request via a two-way encrypted channel marked as "D" to UAS 100 for its priority information. Beacon 300 is programmed to only allow UAS of certain defined priority into the no-fly zone 309. The beacon 300 will act to restrict access of all other UAS from entering the no-fly zone 309. The beacon 300 transmits a handshake and the beacon 300 ID. The UAS 100 responds with UAS 100 ID and priority as well as location. The beacon 300 then transmits beacon location, shape, and all other essential information. The UAS 100 subsequently handles what it should do, and sends entering or exiting no-fly area if applicable.

If the controller 200 is equipped with operator console display capability, the DDS software on UAV 100 may send information via a channel marked as "E" to visually advise the operator 5 that the UAS is about to enter a no-fly zone 309, and optionally provide additional information as to the type of no-fly zone 309.

Figure 4:
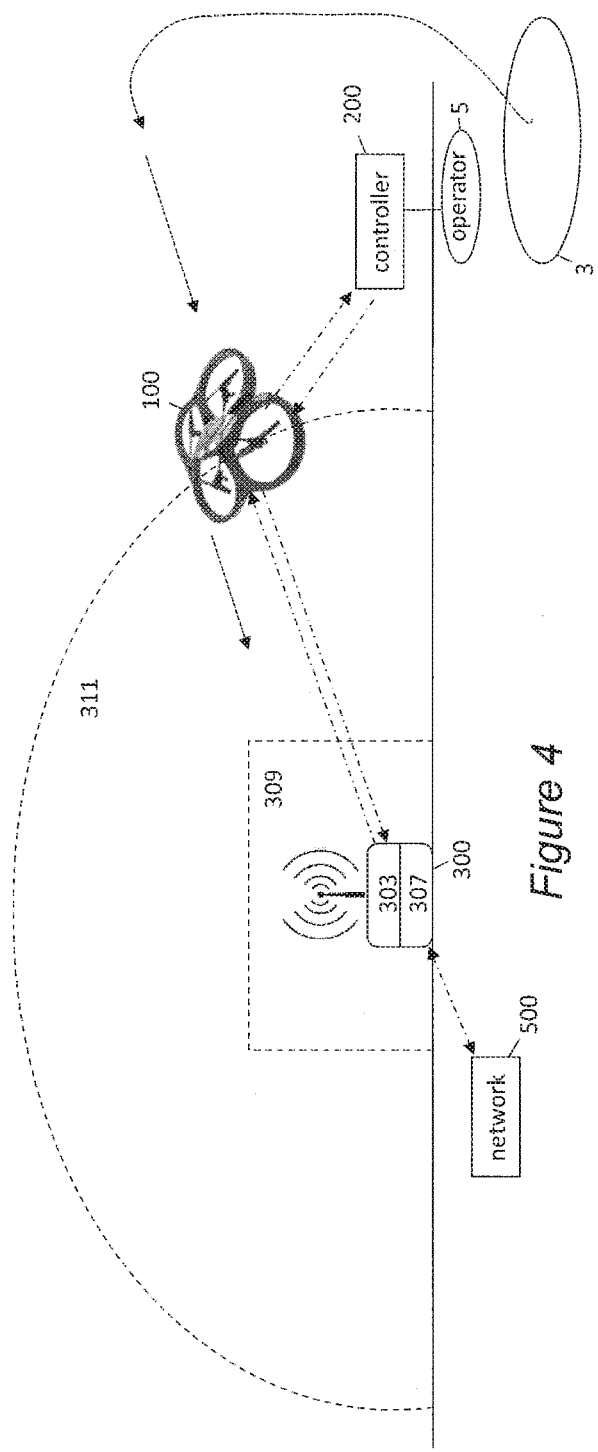
FIG. 4 shows the system of FIG. 1 wherein the UAS sends the information to the DDS, the DDS can then verify the information with a trusted source.

Referring to FIG. 4, the DDS beacon 300 may transmit no-fly coordinates and priority to the network 500 that may be the planned national UAS Traffic Management (UTM). This will allow the system to re-direct UAS with scheduled flight plans intersecting with no-fly zones 309.

Figure 5:
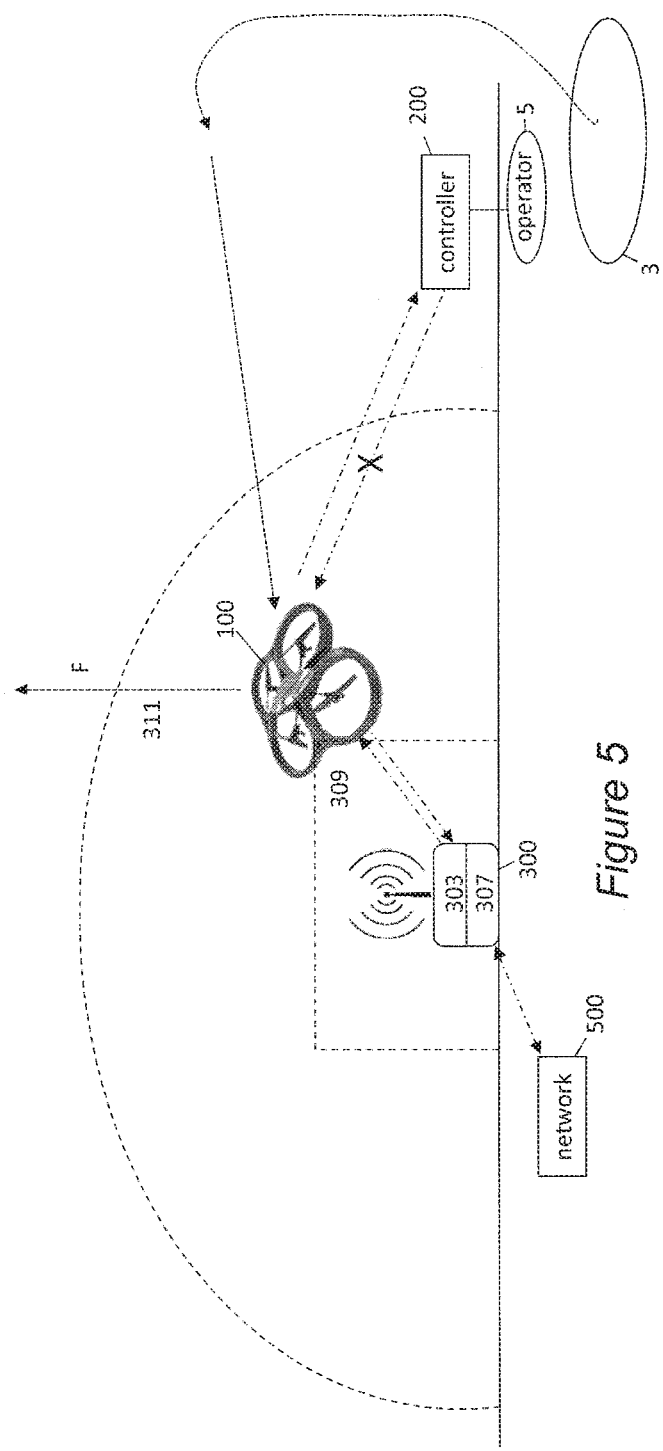
FIG. 5 shows the system of FIG. 1 wherein the DDS has sent commands rerouting the UAS around the no-fly zone.

In FIG. 5, DDS software embedded in the UAS 100 is responsive to commands from beacon 300. In this case, commands are provided to the UAS 100 causing it to be redirected around the no-fly zone 309 as shown by arrow F.

Figure 6A:
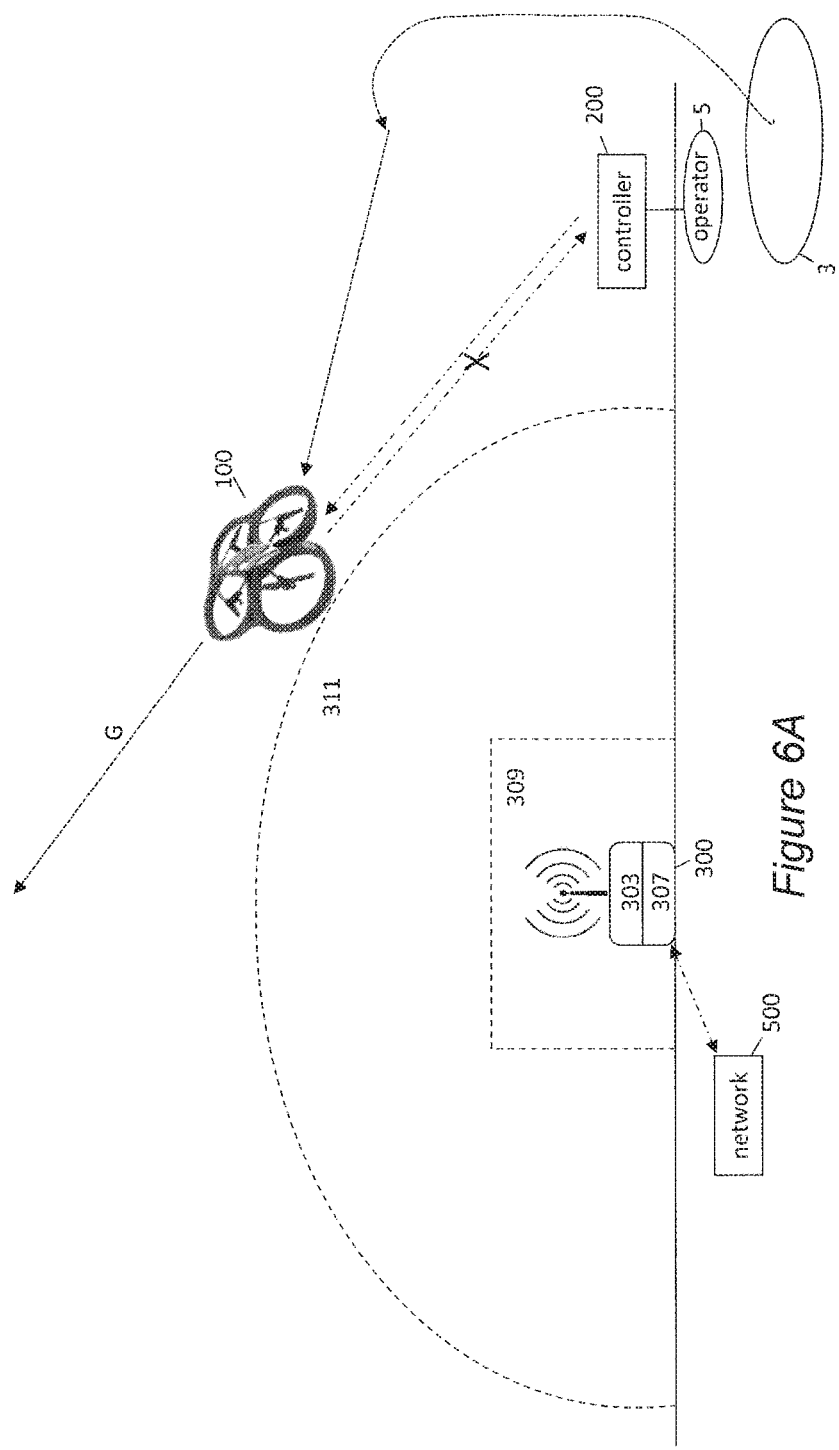
FIG. 6A shows the system of FIG. 1 wherein the planned national UAS Traffic Management (UTM) makes available the DDS no-fly zone information and the UAV operator is rerouting the UAS around the no-fly zone.

In FIG. 6A, beacon 300 may request through the network 500 to have any UAS 100 to reroute around the no-fly zone 309.

Figure 6B:
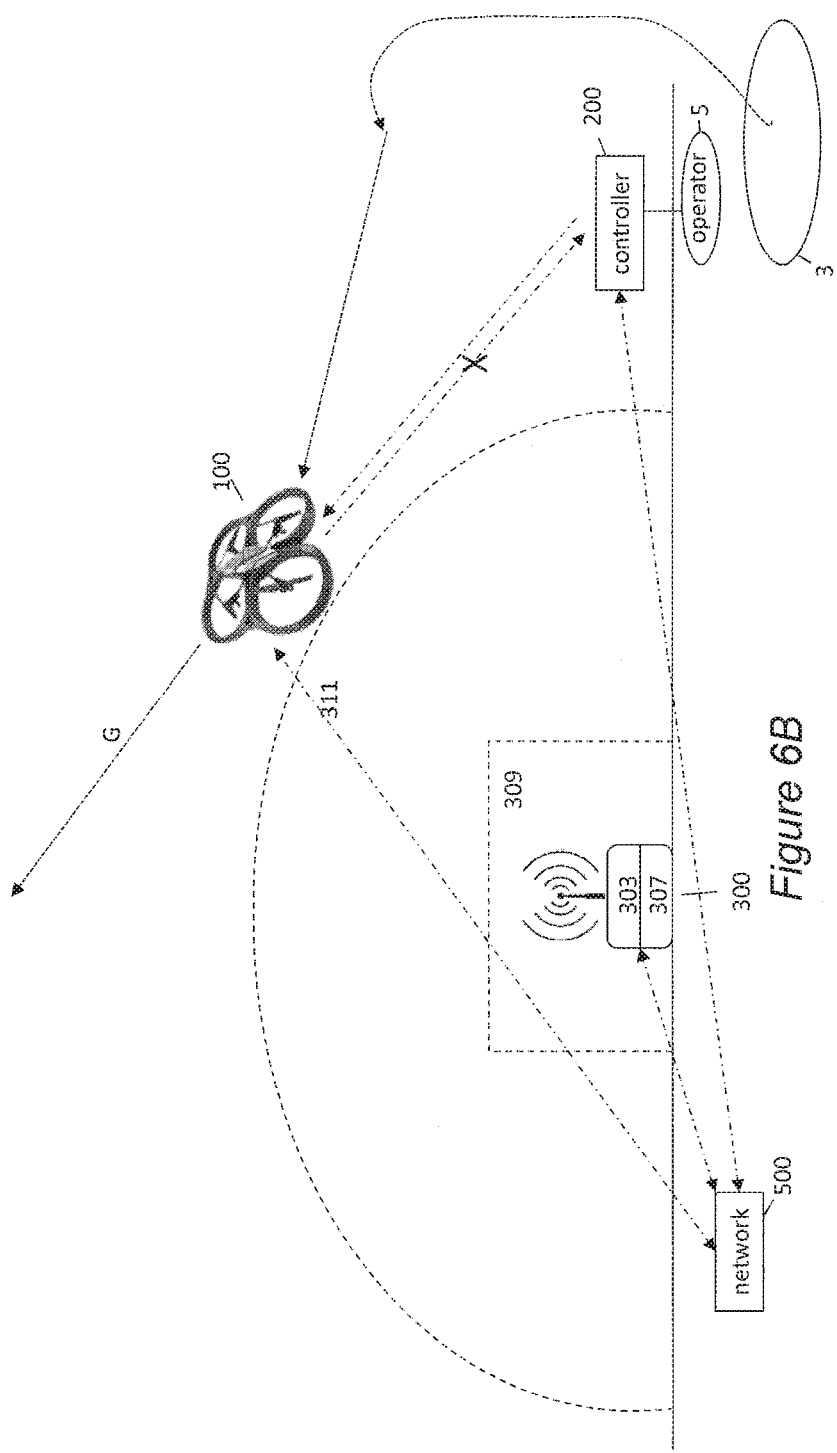
FIG. 6B shows the system of FIG. 1 wherein the UTM is rerouting the UAS around the no-fly zone.

In FIG. 6B, an alternative embodiment, beacon 300 sends information to the network 500 enabling the network 500 to tap into and control the navigation of UAS 100, sending it commands to cause it to reroute around the no-fly zone 309.

Figure 7:
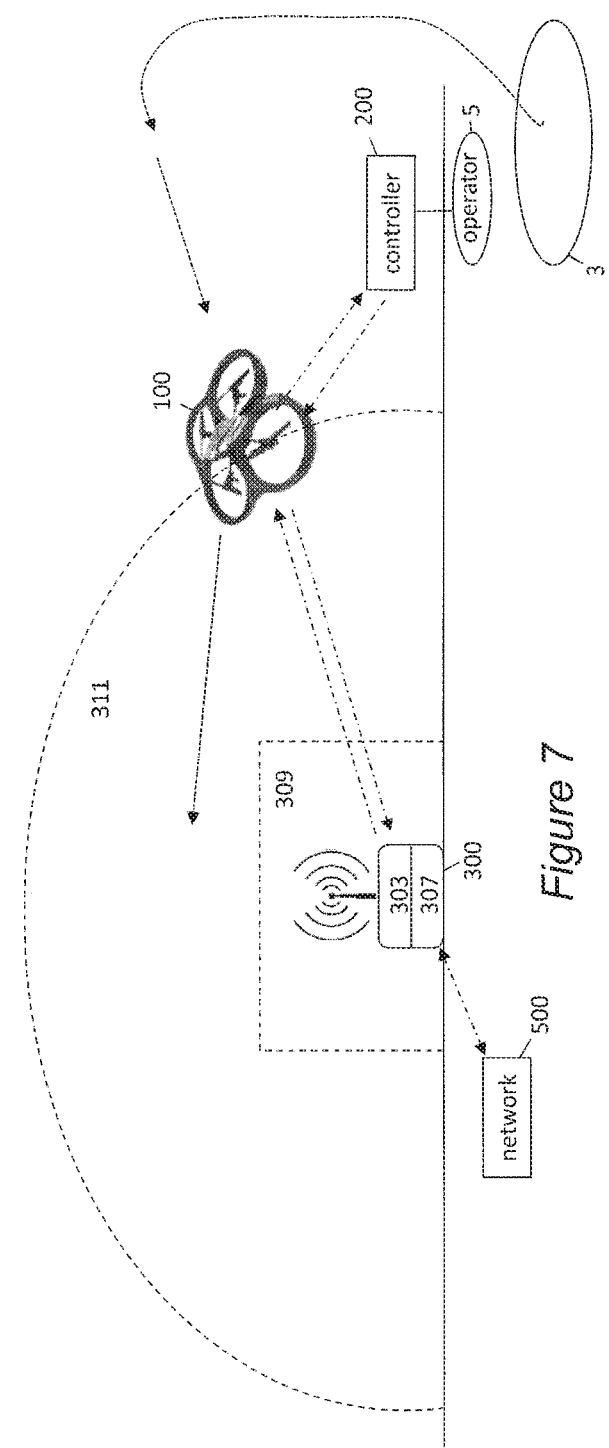
FIG. 7 shows the system of FIG. 1 wherein the UAS is flying towards a no-fly zone and has the correct priority to enter this no-fly zone.

Referring now to the invention shown in FIG. 7, when UAS 100 enters the transmission region 311, the DDS beacon 300 sends the coordinates of the no-fly zone 309 and the required priority to enter no-fly zone 309. This may include one of the priorities described above.

The DDS beacon 300 may transmit a priority level relating to a high-security, emergency, commercial or consumer no-fly zone. When the no-fly zone is active, only UAS presenting the proper authorization keys are allowed to fly in the no-fly zone 309. All other UAS are redirected.

The beacon 300 may receive EMS authorization key updates via a network 500 such as the cloud, the Internet or the UTM, or other authorized and trusted sites.

Figure 8:
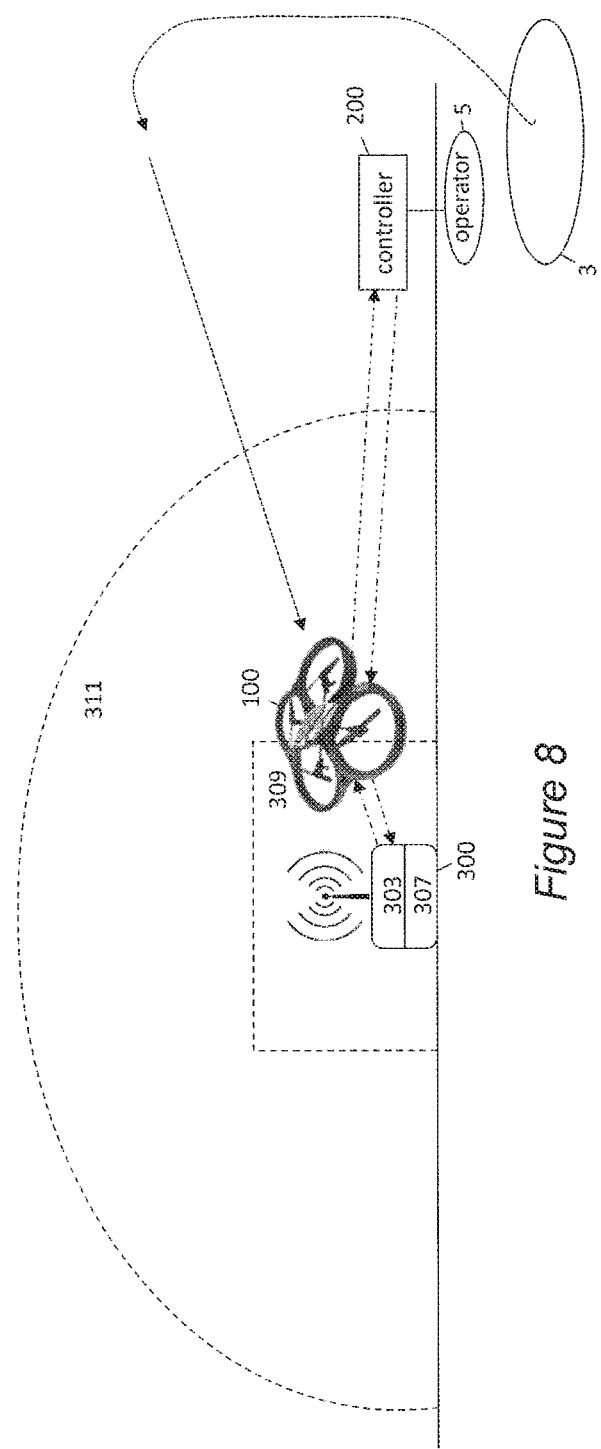
FIG. 8 shows the system of FIG. 1 wherein the UAS has entered the no-fly zone.

In FIG. 8, if the UAS 100 has been pre-approved to fly in the no-fly zone 309, the DDS software embedded in the UAS 100 transmits back an authorization key to the beacon 300. If the UAS 100 is configured with a matching authorization key or higher priority key stored in the beacon 300, the UAS 100 is allowed to enter the no-fly zone 309. In this case, RTH or safe-landing processes will not be initiated.

In more detail, still referring to the invention in FIG. 8, the DDS software in the UAS 100 pings its coordinates to the DDS beacon 300 for the duration of the time that the UAS 100 is in the no-fly zone 309. Upon exiting the no-fly zone 309, the DDS software on the UAS 100 will transmit a message indicating that UAS 100 is exiting the no-fly zone 309 to the DDS beacon 300.

Figure 9:
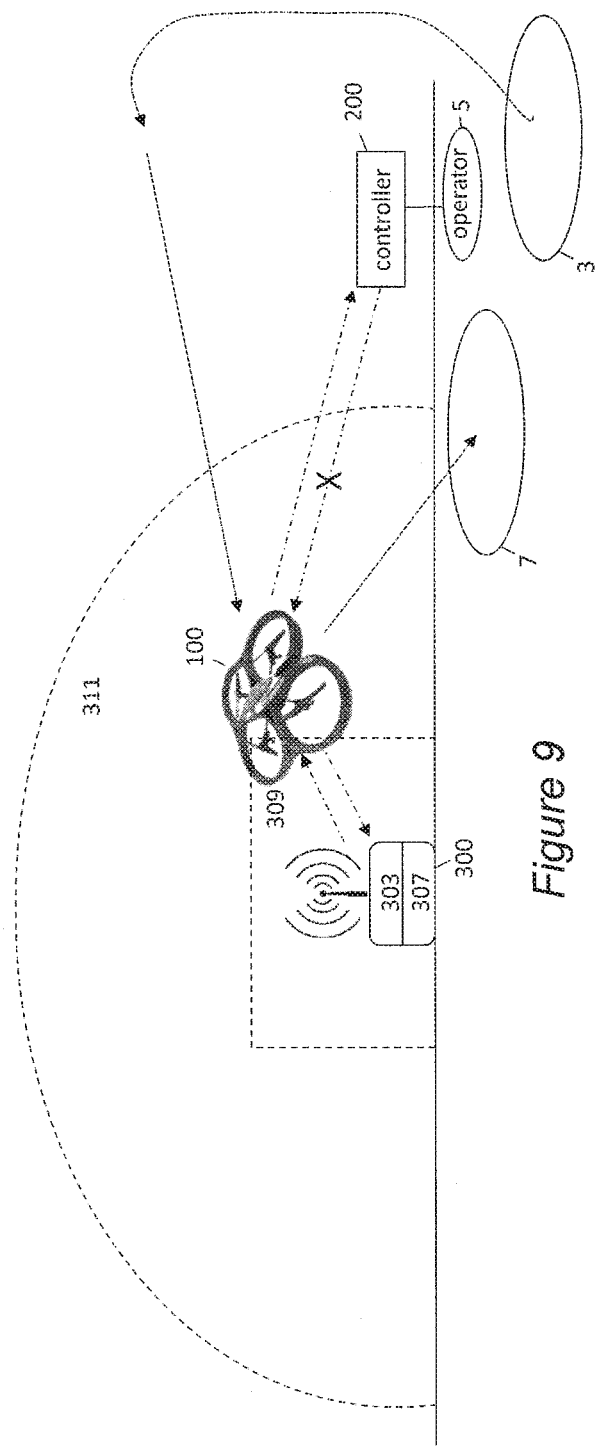
FIG. 9 shows the system of FIG. 1 wherein the UAS has entered the no-fly zone, does not have the proper priority to enter the no-fly zone, and has been identified as a UAS to be captured.
Figure 10A:
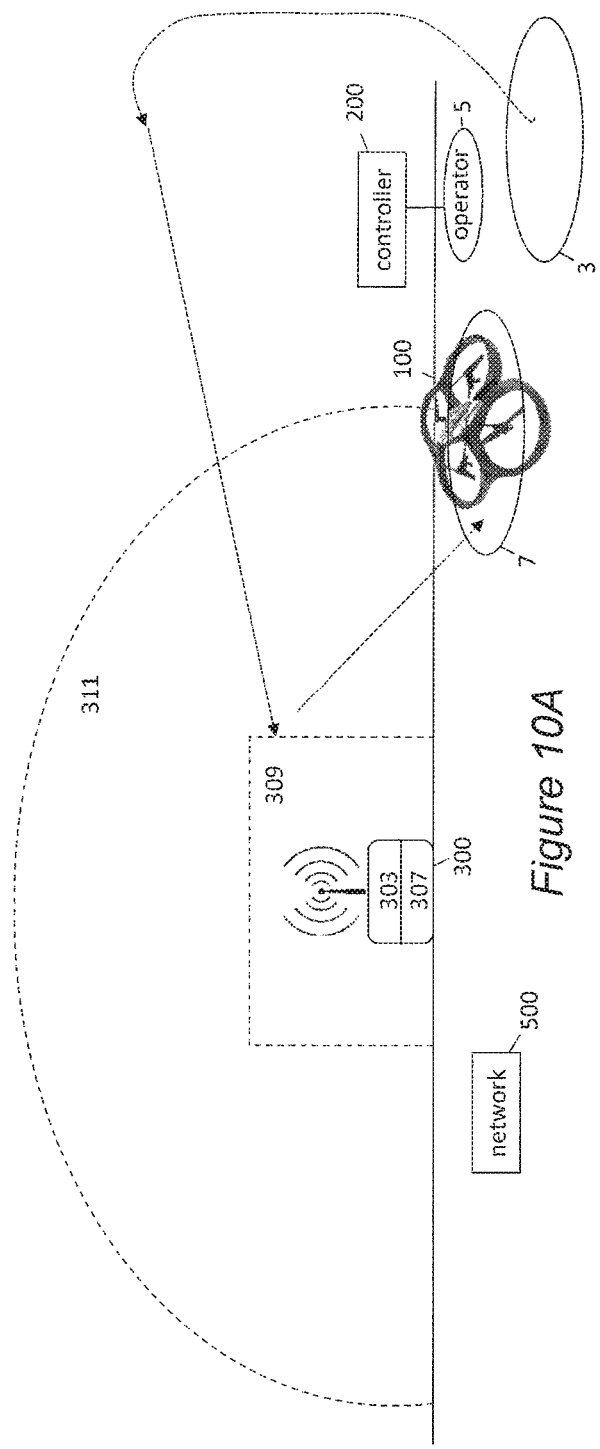
FIG. 10A shows the UAS of FIG. 9 that has been captured.

Under certain conditions, the authorities may want to capture a UAS. As shown in FIG. 9, when UAS 100 in the transmission region 311 enters the no-fly zone 309, and does not have the proper assigned priority, Beacon 300 determines if the UAS 100 has preprogrammed capabilities allowing it to land in a safe location indicated by the authorities. If it does, then Beacon 300 sends to the UAS 100 a command and GPS safe landing coordinates initiating a preprogrammed routine causing it to land at a specified safe landing site, as shown in FIG. 10A.

Figure 10B:
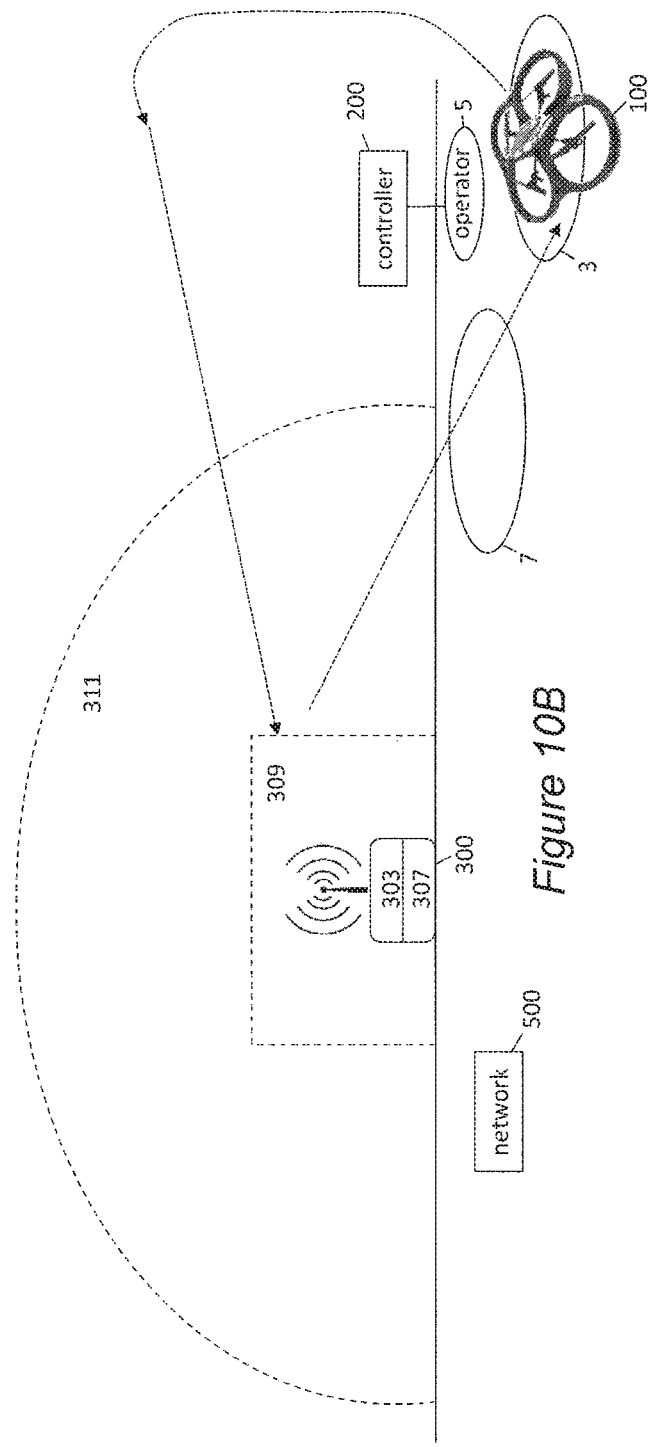
FIG. 10B shows the UAS of FIG. 9 that has been returned home or to original launch.

Other UAS without the DDS Software onboard that have RTH capabilities may also be controlled by the current system. The DDS beacon 300 may communicate with the UAS 100 initiating the RTH preprogrammed routine on the UAS 100 causing it to land at launch site 3 as shown in FIG. 10B.

Figure 11:
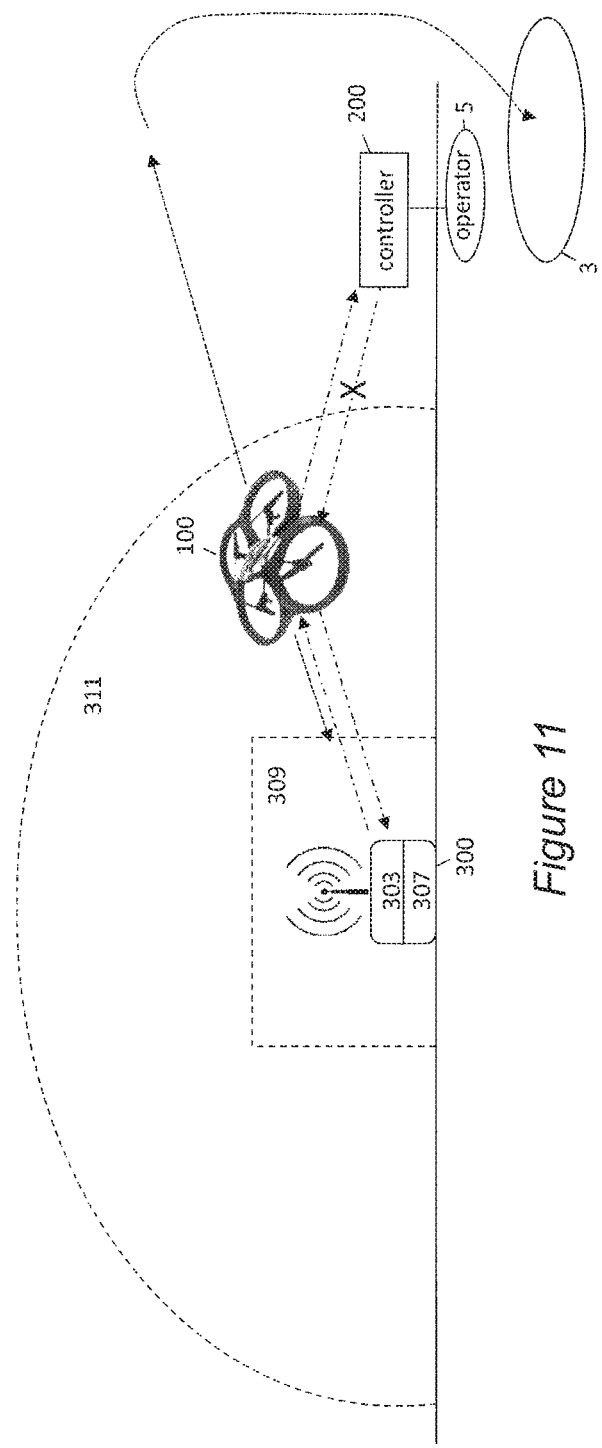
FIG. 11 shows the system of FIG. 1 wherein the UAS has entered the no-fly zone, does not have the proper priority to enter the no-fly zone, and its internal return to Home (RTH) preprogrammed routine has been activated by the DDS.
Figure 12:
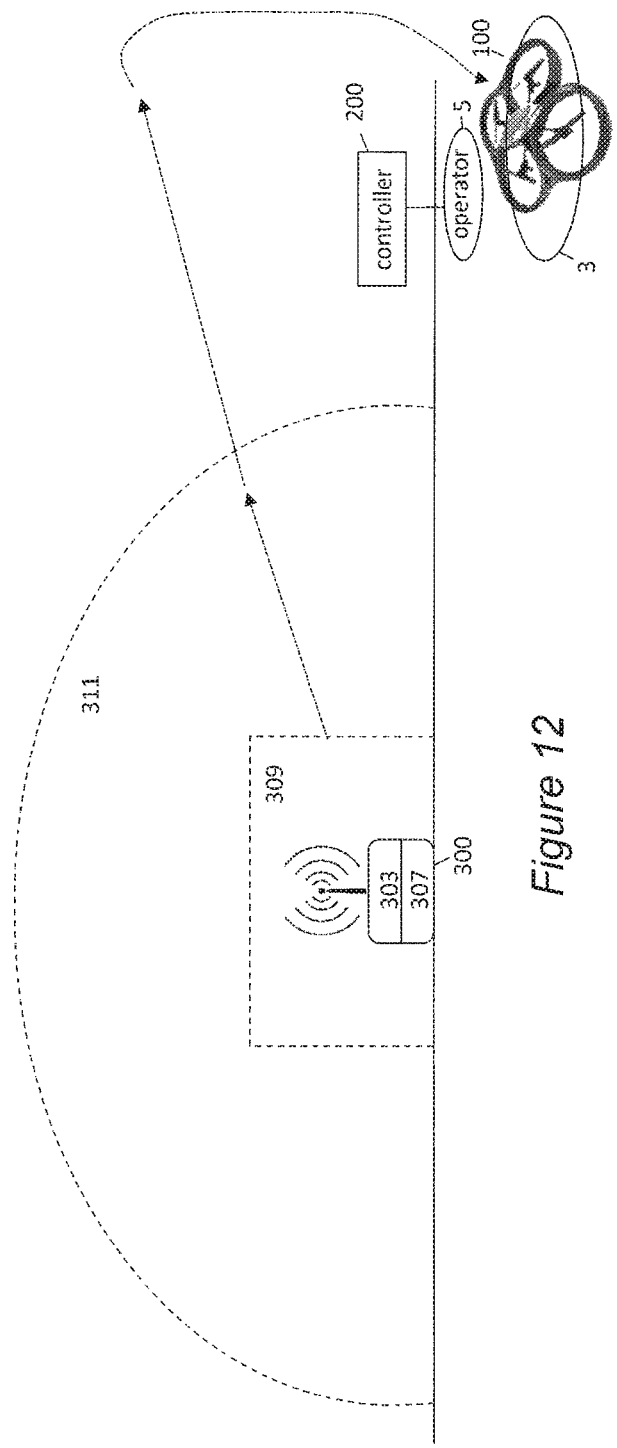
FIG. 12 shows the UAS of FIG. 11 that has been flown back to its original launch site.

Referring now to the invention shown in FIG. 11, when the UAS 100 enters the no-fly zone 309, the DDS beacon 300 initiates a return to home (RTH) command initiating a preprogrammed flight pattern in the UAS 100 causing it to change its course, fly back to, and land at the launch site 3, as shown in FIG. 12. Also, the DDS software should cause any further commands from operator controller 200 to be ignored, so that the operator 5 cannot override the RTH command.

Optionally, the DDS software on UAS 100 sends a message to the controller 200 that is displayed to the operator 5 on a console indicating that the UAS's RTH functionality has been initiated.

Figure 13A:
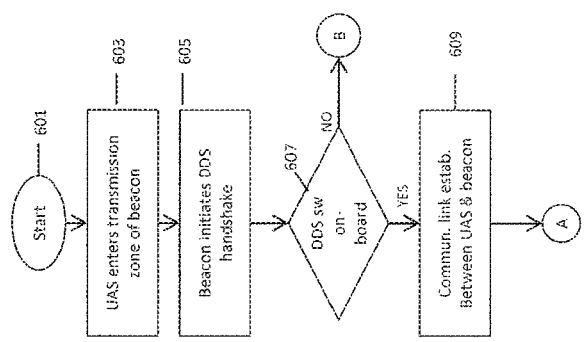
FIGS. 13A-C are a simplified flowchart indicating the functioning of the current system.
Figure 13B:
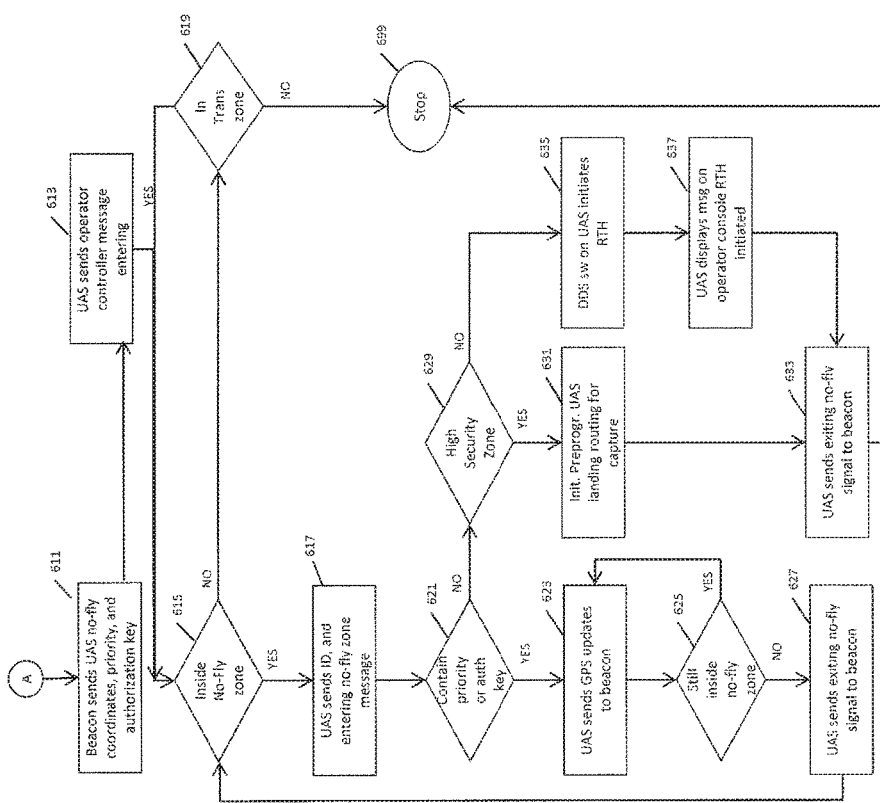
Figure 13C:
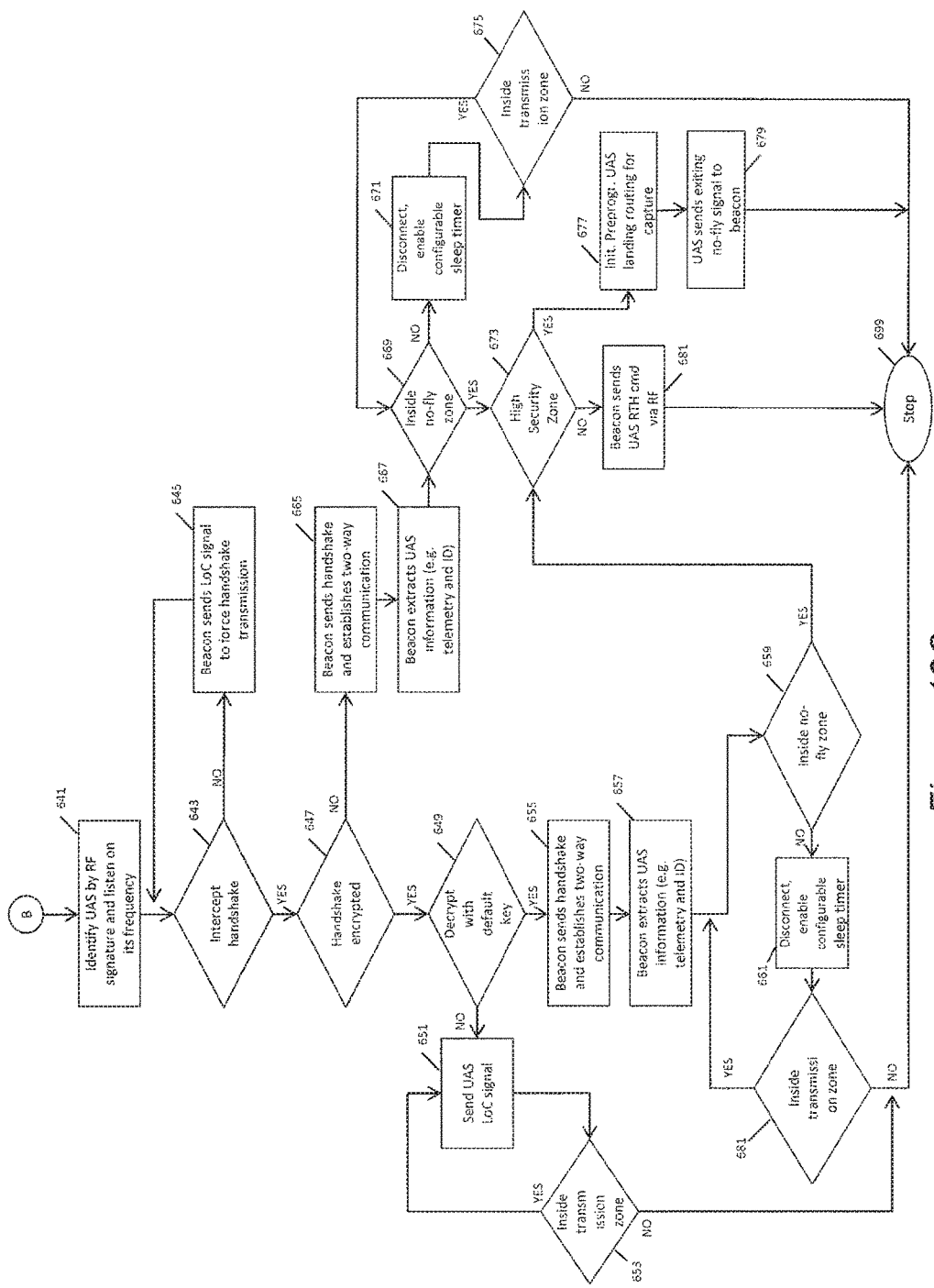

FIGS. 13A, 13B and 13C are a simplified flowchart indicating the functioning of the current system.

It is important to note that the logic of the flow chart is not limited to a single UAS at a time, and the beacon is following the logic for every UAS that enters the transmission zone. The beacon can perform these actions and interact with multiple UAS at any point in time. Once the beacon hits the Stop 699 point in the flow chart there is nothing restricting it from beginning the cycle again and interacting with the same UAS it has previously resolved. The intention of the beacon is not to deflect UAS on an individual basis but instead protect an entire airspace from all UAS threats simultaneously.

Now referring to FIG. 13A, the system begins operation in block 601. In block 603, the UAS enters the transmission region created by the beacon around the no-fly zone.

Still referring to FIG. 13A, in block 605, the beacon sends a DDS specific handshake. This will give any UAS with functioning DDS software an opportunity to respond and establish two-way communication with the beacon.

Still referring to FIG. 13A, in block 607, a determination is made if the DDS software is present and operational on board the UAS. If the UAS responds to the DDS handshake ("yes"), a communications link is established between the beacon and the UAS as indicated in block 609 and processing continues at connector A in FIG. 13B. If the UAS does not respond ("no"), processing continues at connector B in FIG. 13C.

Now referring to FIG. 13B, in block 611 the beacon sends the UAS the no-fly coordinates, zone priority and authorization key. The UAS may send the operator controller DDS messaging. Processing continues through block 615 where a determination is made if the UAS has entered the no-fly zone and if so ("yes") processing continues through block 617. If the UAS is not inside the no-fly zone ("no") a determination is made in block 619 whether the UAS remains inside the transmission zone. If the UAS remains inside the transmission zone ("yes") then processing continues at block 615 where a determination is again made whether the UAS is in the no-fly zone. If the UAS has left the transmission zone ("no") then the processing ends at the Stop 699.

Still referring to FIG. 13B, in block 617 the authorization key and the UAS ID or MAC address are sent by the UAS to the beacon that verifies the authorization key with a prestored or dynamically generated authorization key, or by communicating with a network, such as the FAA database, or the planned UTM Network. Processing continues to block 621.

Still referring to FIG. 13B, in block 621 a determination is made whether the UAS has adequate authorization key or priority to enter the no-fly zone. If the UAS has adequate clearance ("yes"), the UAS sends the beacon updates as to its location and other information in block 623 and processing continues in block 625. If the UAS does not have adequate authorization key or priority to be in the no-fly zone ("no"), processing continues in block 629.

Still referring to FIG. 13B, if the UAS is in the no-fly zone in block 625 ("yes") processing continues back to block 623. If the UAS has left the no-fly zone ("no") it indicates when it is exiting the no-fly zone in block 627 and processing resumes at block 615.

Still referring to FIG. 13B, in block 629, a determination is made whether the no-fly zone is a high security zone such as an EMS or a prison. If the no-fly is a high security zone ("yes"), processing continues at box 631 where the DDS beacon initiates preprogrammed landing routing to specified set of GPS coordinates causing the UAS to land at a safe landing site, allowing the authorities to capture the UAS in block 631. Processing continues at block 633 where the exiting UAS sends a notification to the beacon. The process concludes at Stop 699. If the zone is not a high security zone ("no") in block 629, processing continues at block 635.

Still referring to FIG. 13B, in block 635, the DDS software on the UAS initiates RTH functionality causing the UAS to return to home or to its launch point. Processing continues to block 637 when the UAS may display a message on the operator console when RTH is initiated. Processing continues at block 633 where the exiting UAS sends a notification to the beacon. Processing then ends at Stop 699.

Now referring to FIG. 13C, in block 641, the beacon intercepts RF signals between the UAS and its controller. The beacon then uses this information to discern the type of UAS and communication methods between the UAS and its controller. Processing continues to block 643.

Still referring to FIG. 13C, in block 643, the beacon attempts to intercept a handshake between the UAS and its controller. If this handshake is intercepted ("yes") the processing continues to block 647. If the handshake is not intercepted ("no"), processing continues to block 645. In block 645, the beacon sends a LoC signal to the UAS forcing the handshakes to be transmitted. Processing then returns to block 643.

Still referring to FIG. 13C, in block 647, the beacon discerns if the handshake is encrypted. If the handshake is encrypted ("yes"), then processing continues to block 649. If the handshake is not encrypted ("no"), then processing continues to block 665. In block 665, the beacon transmits the handshake and establishes two-way communications with the UAS. Processing then continues to block 667 where the UAS sends information to the beacon. Information can include ID, telemetry data, GPS coordinates or any other information. Processing then continues to block 669.

Still referring to FIG. 13C, in block 669, the beacon uses the information gathered from the UAS to determine if it is within the no-fly zone of the beacon. If the UAS is not within the no-fly zone of the beacon ("no"), then processing continues to block 671 where the beacon disconnects from the UAS and begins a configurable sleep timer. After the timer ends, processing continues to block 675 where the beacon determines if the UAS is still inside the transmission zone. If the UAS is still in the transmission zone, ("yes"), processing returns to block 669. If the UAS is not in the transmission zone ("no"), then processing ends at Stop 699. If the beacon determines the UAS is within the no-fly zone of the beacon ("yes"), then processing continues to block 673.

Still referring to FIG. 13C, in block 673, the beacon determines if the no-fly zone is a high security zone. If the no-fly zone is a high security zone ("yes"), processing continues to block 677 where the beacon initiates a preprogrammed flight routine causing the UAS to land at a predetermined location to be captured. If the no-fly zone is not a high security zone ("no"), then the processing continues to block 681. In block 681, the beacon initiates a preprogrammed flight routine stored on the UAS causing it to RTH. Processing then ends at Stop 699.

Still referring to FIG. 13C, in block 649, the beacon attempts to decrypt the handshake using default decryption keys. If the beacon successfully decrypts the handshake ("yes"), then processing continues to block 655. If the beacon cannot decrypt the handshake ("no"), then processing continues to block 651. In block 651, the beacon sends the LoC signal to the UAS. Processing then continues to block 653.

Still referring to FIG. 13C, in block 653, if the UAS is still within the transmission range of the beacon ("yes") then processing returns to block 651. This loop will initiate the UAS default behavior on connection loss, typically RTH. This will continue until the UAS has left the zone or is powered off. If the UAS is not in the transmission range of the beacon ("no") then processing ends at block 699.

Still referring to FIG. 13C, in block 655, the beacon sends the encrypted handshake to the UAS to establish two-way communication. Processing then continues to block 657 where the UAS sends information to the beacon. Information can include ID, telemetry data, GPS coordinates or any other information. Processing then continues to block 659.

Still referring to FIG. 13C, in block 659, the beacon determines if the UAS is within the no-fly zone of the beacon. If the UAS is inside the no-fly zone of the beacon, ("yes") then processing continues to block 673. If the UAS is not in the no-fly zone of the beacon ("no") then processing continues to block 661. In block 661, the beacon disconnects from the UAS and begins a configurable sleep timer. After the timer ends, processing continues to block 681, where the beacon determines if the UAS is still in the transmission zone. If the UAS is in the transmission zone ("yes"), then processing returns to block 659. If the UAS is not in the transmission zone ("no"), then processing ends at Stop 699.

Figure 14:
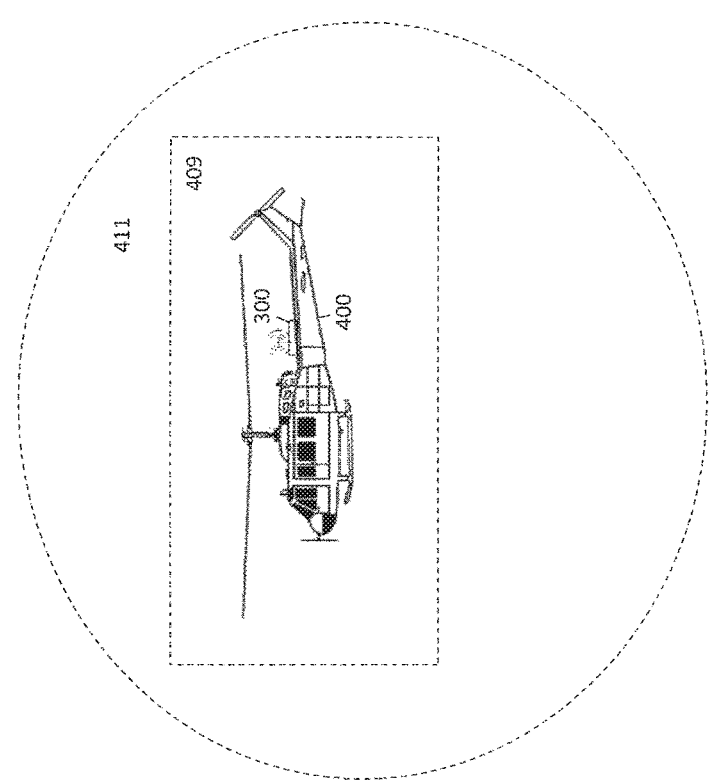
FIG. 14 shows the system of FIG. 1 as a mobile embodiment.

FIG. 14 shows an embodiment of the current invention wherein the beacon 300, which had been previously stationery, is now attached to a vehicle 400 that can move to different locations. In this case, vehicle 400 is a helicopter. Beacon 300 has a transmission region 411 that encloses the no-fly zone 409 around the helicopter 400. This effectively sets up a no-fly zone that moves with the helicopter 400 to prevent collisions with UAS in the area. This technology may be applied to almost any vehicle that would like to prevent UAS from coming near the vehicle. Please note that FIG. 14 is drawn for illustrative purposes and is not drawn to scale.

Figure 15:
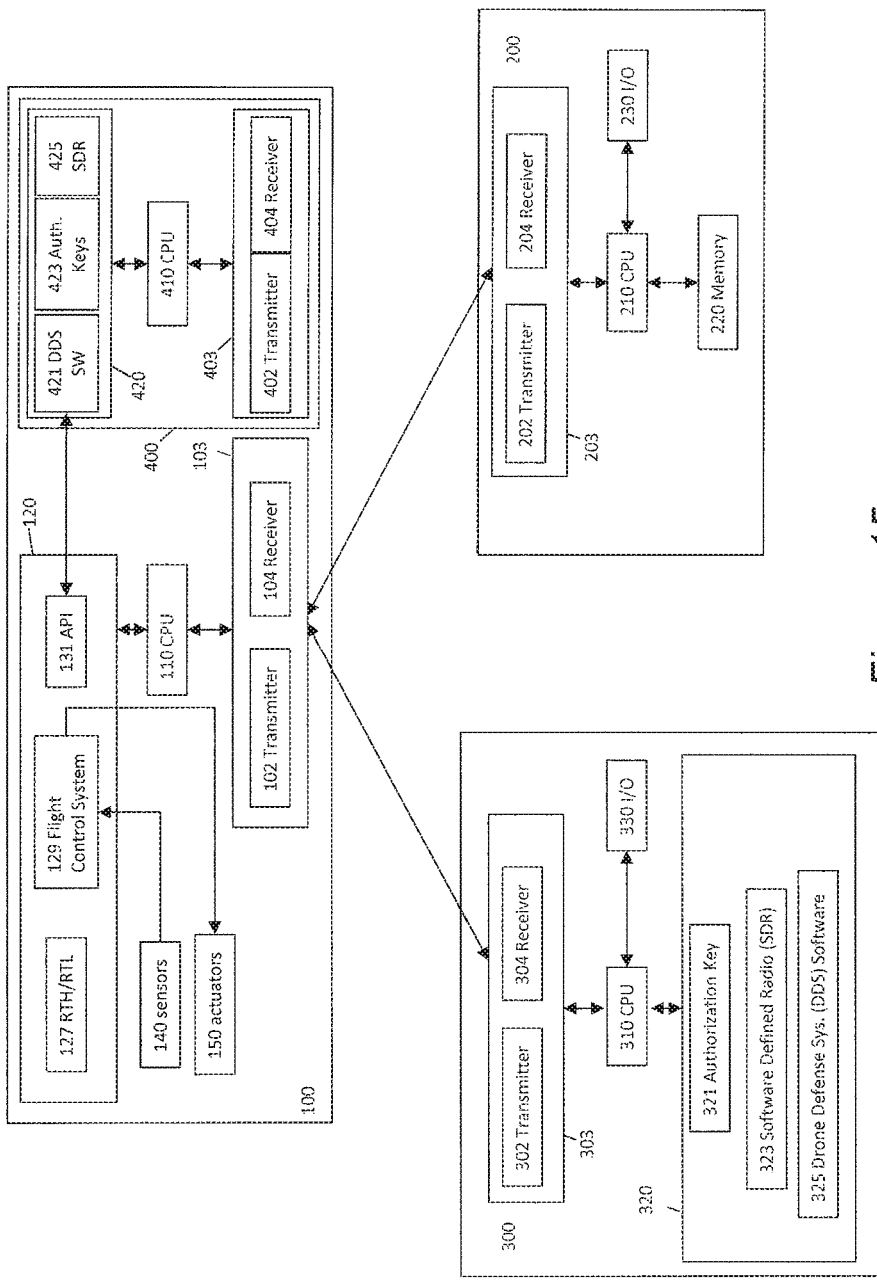
FIG. 15 shows a simplified block diagram of some of the major parts of one embodiment of the system according to the current invention.

FIG. 15 shows a simplified block diagram of the major parts of one embodiment of the system according to the current invention. The UAS 100 is shown which employs a transponder 103 having a transmitter 102 section that transmits outgoing information encoded in an RF signal and a receiver 104 section which receives an RF signal and processes it.

Similarly, the controller 200 employs a transponder 203 having a transmitter 202 section that receives a signal and encodes it into an RF signal that is transmitted to a receiver. Controller 200 also has a receiver 204 section that receives an RF signal and processes it.

Similarly, beacon 300 employs a transponder 303 having a transmitter 302 section that transmits an outgoing signal into an RF signal, and a receiver 304 section that receives an RF signal and processes it.

Similarly, DDS 400 employs a transponder 403 having a transmitter 402 section that transmits an outgoing signal into an RF signal, and a receiver 404 section that receives an RF signal and processes it.

The UAS 100 has a CPU 110 coupled to a memory 120, the transponder 103, at least one sensor 140, actuators 150, and DDS 400. There are also routines stored in memory 120 that may be executed by the CPU 110 to provide functionality. Flight control system software may be run by the CPU 110 to read from the sensors 140 and actuate the flight motors and rudders to fly to desired locations.

The RTH preprogrammed routine functionality is stored in memory 120. Once the RTH routine is initiated, the CPU controls the actuators 150 and reads from the sensors 140 to fly the UAS 100 to its home or initial launch site.

The DDS 400 also has a CPU 410 that connects to the transponder 403 and memory 420. DDS software 421, authorization key 423 routines, and software defined radio SDR 425 are stored in memory 420. DDS software 421 interacts with API 131 to manage the initiation of various RTH routines and to receive information from UAS 100. Information from UAS 100 can be sent and received from transponder 403 to transponder 303.

The beacon 300 also has a CPU 310 that connects to the DDS transponder 303 and a memory 320. A memory 320 has prestored executable routines such as software defined radio that are run by the CPU 310 to allow DDS transponder 303 to communicate in many different programmable formats. Beacon 300 may also employ an Input/Output (I/O) device 330 to interact with a user.

Memory 320 has prestored DDS software 325 designed to interact with the DDS software 421 of the UAS 100. A unique authorization key 321 is prestored in the memory 320 or automatically generated by the CPU 310 of the beacon 300 and is used to verify the priority or authorization of UAS 100.

Controller 200 employs a CPU 210 to control the transmitter 202 and a receiver 204 of transponder 203. CPU 210 may run routines prestored in a memory 220, and interact through I/O 230 with a device that incorporates a display.

Beacon 300, UAS 100, DDS 400, and controller 200 communicate and interact with each other as described above.

In more detail, still referring to the invention, the transmission duration of beacon 300 may be configured to be constant (24 hours×7 days) as in the case for deployments such as airport perimeters, prisons, hospital helipads, and other critical infrastructure. The transmission of beacon 300 may also be pre-scheduled to activate/de-activate as in the case for temporary no-fly zones near outdoor sports stadiums coordinated with event schedules. The transmission schedule for the beacon 300 may be on-demand as in the case for emergency services such as fire trucks and ambulances.

Referring now to the invention, in FIG. 16A, a UAS 100 has started at launch site 3 and is being flown and controlled by an operator 5 using an operator controller 200 within a limited-fly zone 313 located within a no-fly zone 309.

In this figure, the UAS 100 has launched from launch site 3 and is flying toward the boundary of the limited-fly zone 313.

Figure 16B:
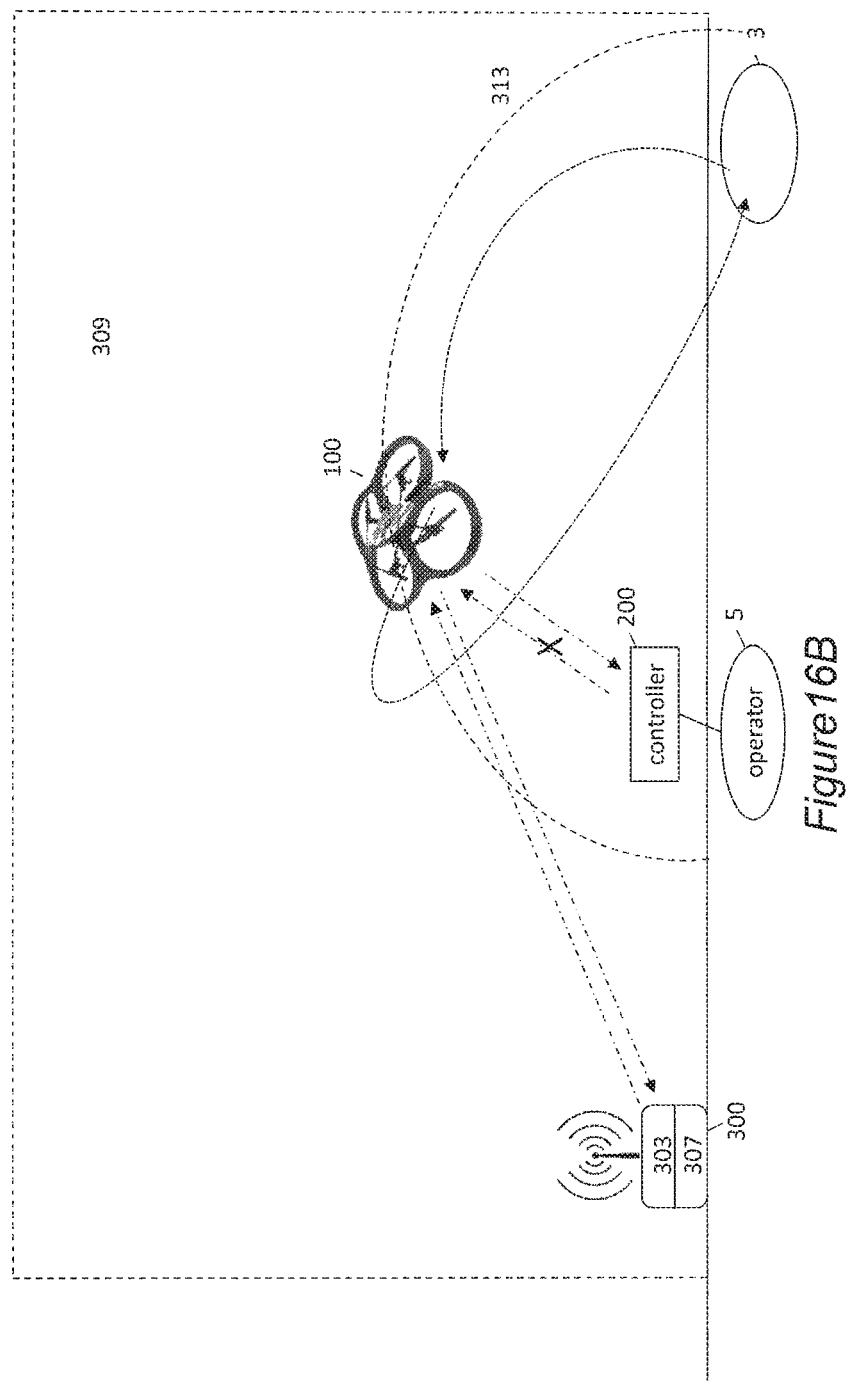
FIG. 16B shows the UAS of FIG. 16A has flown out of the limited-fly zone, within the no-fly zone.
Figure 16C:
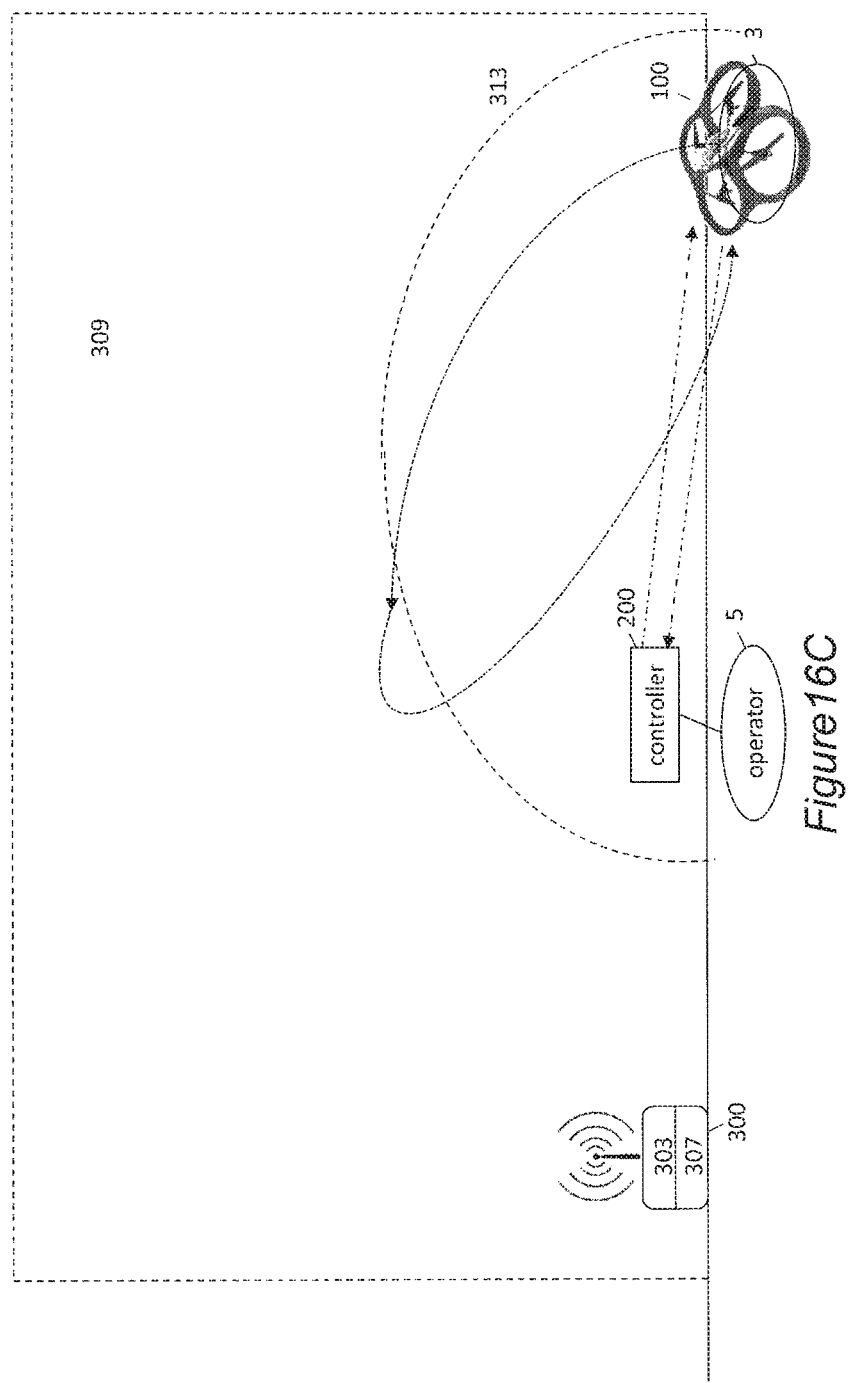
FIG. 16C shows the UAS of FIG. 16B has been returned to its original launch point.

In FIG. 16B, when the UAS 100 exited the limited-fly zone 313, the DDS software on the UAS 100 initiated a preprogrammed RTH routine to route the UAS 100 to launch point 3. FIG. 16C shows UAS safely landed at launch point 3.

Figure 17A:
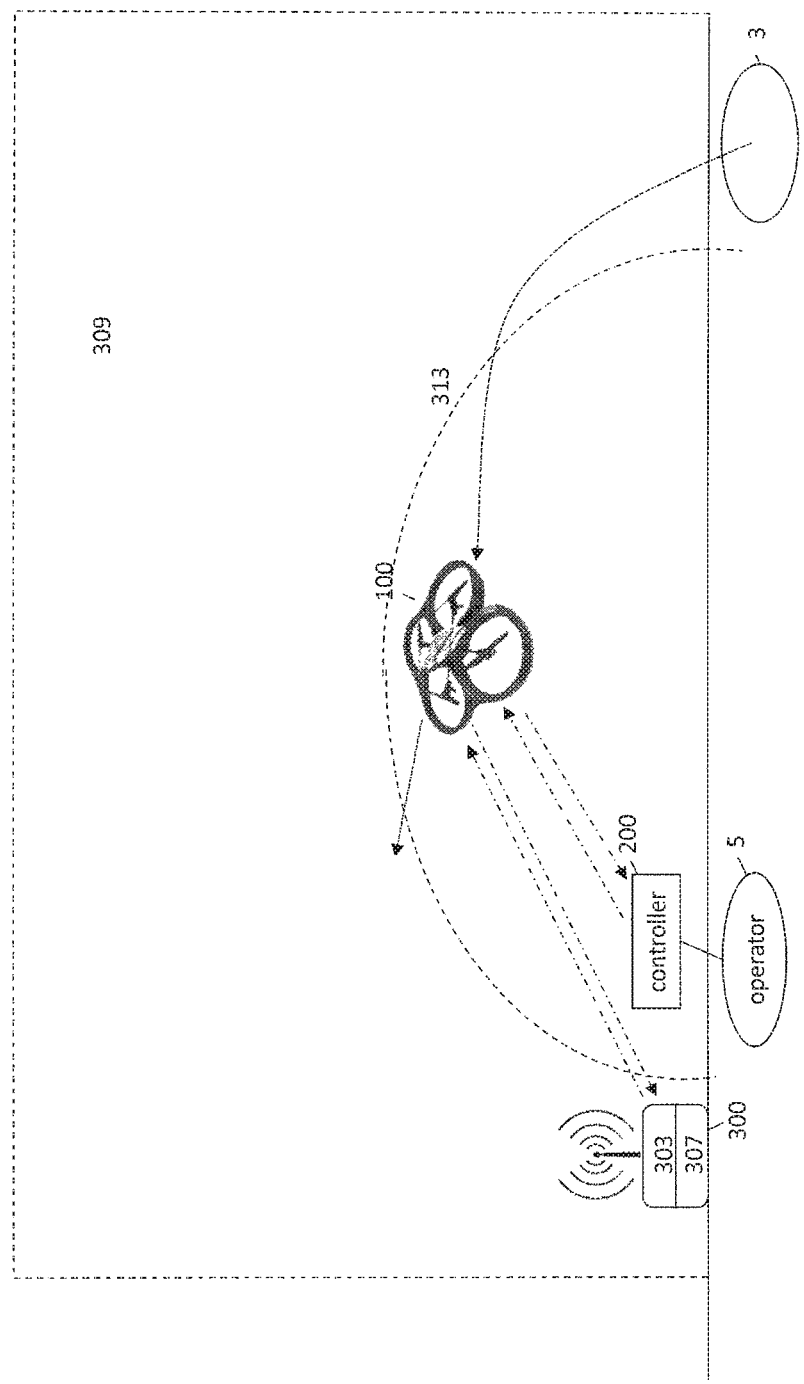
FIG. 17A shows the limited-fly zone of FIG. 16A has moved beyond the range of the initial launch point.

Referring back to the scenario of FIG. 16A, FIG. 17A shows a situation in which the limited-fly zone 313 has moved within no-fly zone 309 and launch site 3 is no longer located within the limited-fly zone 313.

Referring back to FIG. 17A, FIG. 17B shows a scenario in which UAS 100 has exited the limited-fly zone 313 into the no-fly zone 309. Because UAS 100 launch site 3 is located outside of the limited-fly zone 313, beacon 300 initiates preprogrammed flight routines to fly to a specific location 9 within the limited-fly zone 313 near operator 5.

Figure 18:
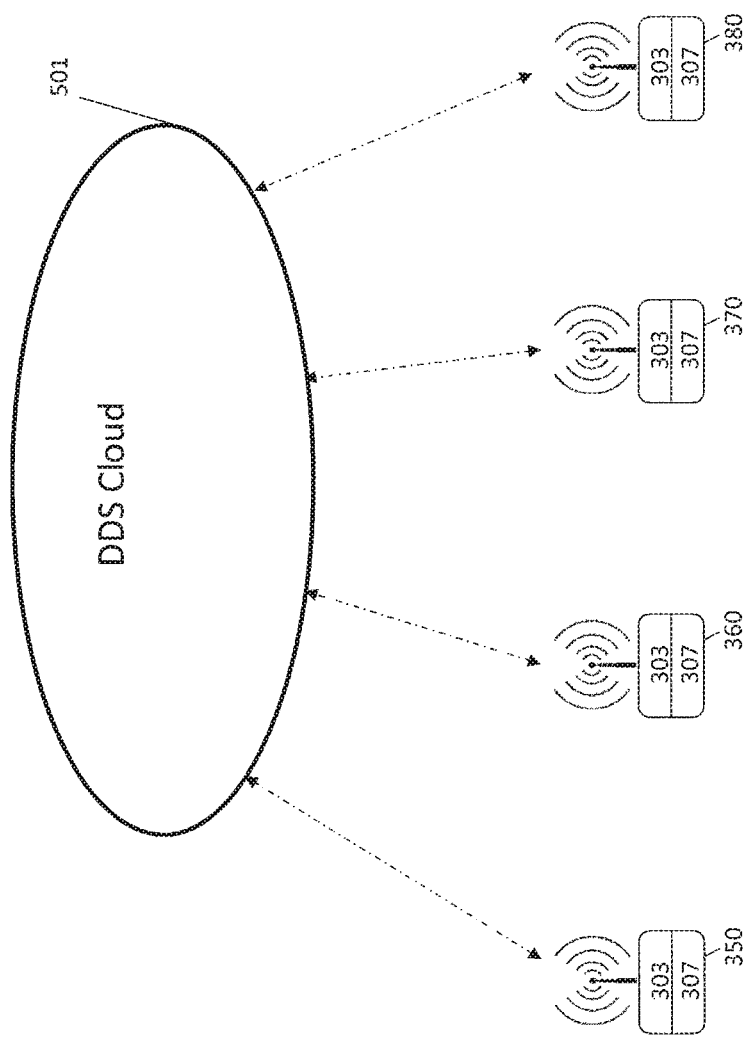
FIG. 18 shows a system in which multiple active beacons are connected to a DDS repository, via a wireless two-way communication such as an LTE connection, for the purposes of data gathering and sharing throughout the DDS network or with external networks.

Referring now to the invention in FIG. 18, multiple beacons 350, 360, 370, 380 are actively protecting airspaces in unique locations. Now referring specifically to beacon 350 as an example for all beacons 350, 360, 370, 380, when beacon 350 interacts with a UAS 100 as shown in any of the previous figures, beacon 350 logs the event as well as all pertinent information into computing device 307. Beacon 350 then wirelessly connects to a network through a transponder 303; in this particular scenario the network is a DDS cloud 501. The beacon 350 regularly sends data to and receives data from the DDS cloud 501. Once the DDS cloud 501 has received a new event, the DDS cloud 501 may then manipulate the data to create real time statistics. The DDS cloud 501 may also disseminate any event to any other network 500, such as the UTM. The computing device 307 may receive software updates through DDS cloud 501.

While the present disclosure illustrates various aspects of the present teachings, and while these aspects have been described in some detail, it is not the intention of the applicant to restrict or in any way limit the scope of the claimed systems and methods to such detail. Additional advantages and modifications will readily appear to those skilled in the art.

Therefore, the teachings of the present application, in its broader aspects, are not limited to the specific details and illustrative examples shown and described. Accordingly, departures may be made from such details without departing from the spirit or scope of the teachings of the present application. Moreover, the foregoing aspects are illustrative, and no single feature or element is essential to all possible combinations that may be claimed in this or a later application.

Figure 19:
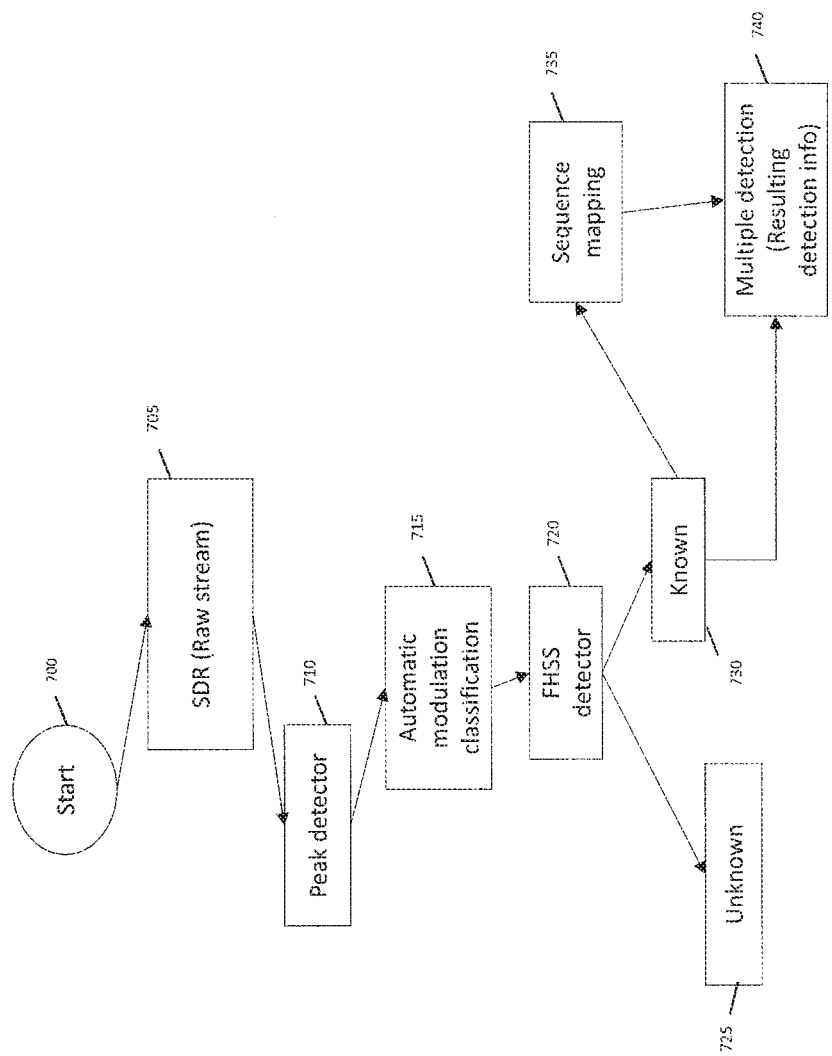
FIG. 19 shows a flow chart illustrating an embodiment of a detection method utilized by the DDS once a UAS has entered a transmission region.

Referring now to FIG. 19, there is a method of detection of a UAS, upon entering a transmission region 311 (see FIG. 1). The method begins operation in block 700. The DDS RF detection hardware includes CPU 310 (see FIG. 15) and internal memory 320 (see FIG. 15). Attached to the CPU 310 is a Software Defined Radio (SDR) 323 (see FIG. 15). SDR 323 utilizes transceiver 303. In block 705, the SDR will collect a raw data stream. The advantage to using SDR over a traditional hardware radio is that the operator can easily alter, customize or update the software in SDR. This allows the system to adjust filters, change central frequencies, and many other aspects that are not as easy with a hardware radio. Most UAS use Frequency Hopping Spread Spectrum (FHSS). Frequency hopping is a method for widening the spectrum of a data-modulated carrier by changing the frequency of the carrier periodically. The hopping sequence, also called spreading code, which is the frequency of channels that carrier will hop within one periodic time, is usually pseudo-noise (PN). This technique makes the frequency hopping system very robust, secure, and anti-jamming.

Most of the detection capabilities of the DDS come from the software involved in the signal processing. The hardware receives the raw signals on allowed and open bands. This means that one receiver can pick up multiple signals simultaneously. SDR can also sweep in a very wide spectrum to cover all the frequencies where a potential drone signal may emerge.

Raw data from SDR will be pre-processed via Discrete Fourier Transform (DFT) and passed through a peak detector as shown in block 710. The peak detector has a configurable window, which will select the peak with highest power, or a power above a certain threshold, inside the window using a first-order difference. The peak detector will select the signal's peak frequency, bandwidth (0.707 of peak power) and pass the window's Power Spectral Density (PSD) to next step.

Then, the signal will be processed and several features will be selected, including but not limit to, maximum power spectral density of normalized centered instantaneous frequency and standard deviation of normalized centered absolute frequency and bandwidth. As shown in block 715, a classifier can then use all the features selected for automatic modulation classification (AMC). GFSK/FSK signals, or any other signal deemed as important, can be selected and the other signals will be filtered out.

Once the unwanted signals are filtered out the system can begin to track the potential UAS signals. This can be done by comparing specific signal characteristics such as but not limited to dwell time, sleep time, bandwidth, power, frequencies, and the periodic time for hopping signal to repeat in the same frequency, and the hopping sequence. After this process is complete unwanted signals are filtered out.

These signals are sorted, compared, and classified via a FHSS detector in block 720. In blocks 730 and 725, the signals are classified as known or unknown signals respectively.

A known signal has specific characteristics that match a previously observed signal. The previously observed signal or its characteristic details are stored within memory 320 (see FIG. 15). These categories are then compared again within each category to determine how many signals are present. All the signals that fit within "Known Signal A" are compared and separated by signal characteristics such as but not limited to hopping sequence and power. The result is a known number of a known type of UAS operating within transmission region 311 (see FIG. 1) at the same time.

Unknown signals are also handled in a similar way; however, those signals must be compared over more criteria to appropriately discern separate signals from potential false alarms. The results of all the categories are stored in memory 320. These data are then processed again to determine the appropriate actions to take for each signal.

Each known hopping signal is detected by matching periodic time, dwell time and spreading channels. The system will compare these to drone signal signatures stored in memory 320 and give alert if they are a match. Then the system will begin to track.

In block 735, each known hopping signal is identified by tracking part of, or the complete hopping sequence. During tracking, the system will look for the start of a sequence. Once found, it will match other known criteria, such as hop time, and map a partial hopping sequence within the system's sampling rate. As shown in block 740, if the captured partial hopping sequence is not able to identify the signal, the system can overlap its sweeping center frequency, map several partial sequences, and generate a full hopping sequence for identification. The captured sequence can also be used for signal disruption or sending RTL commands during defense.

Each unknown hopping signal is identified by its features including but not limit to periodic time, dwell time, power, modulation type and channel space. The system will look up all the bursts with the same modulation type and categorize them using periodic time and dwell time. In the same class, the bursts will be differentiated using peak power, the same signal should have a power fluctuation within 3 Db. Finally, the system will calculate the channel space between the captured spreading channels. Frequency hopping systems tend to have a constant channel space.

Besides detecting frequency hopping drone signals, the system is also able to detect signals including but not limited to Wi-Fi®), wireless controller signal, Bluetooth®, FPV video feed, XBee, ZigBee®, which make it a potential wireless device detector.

The hardware can be set up so that multiple SDRs and antennae are working on one computer. When there are multiple, the CPU 310 can configure the SDRs to work in unison, as a master-slave, or as any other layout. This means that the system can, but is not limited to, allow both SDRs to be detecting at the same time, have one detect while the secondary one handles a specialized tracking algorithm, or some other form of cooperation between the SDRs. Multiple computers can be networked together to coordinate a more complete DDS. The beacons can have similar behaviors in that they can but are not limited to run independently, as a coordinated team, or as a master/slave configuration. With the ability to network the system, the detection range/coverage of a protected airspace can be easily scaled to meet the end customers' needs.

Another component of the system's detection is Wi-Fi® based UAS communications. This form of control often carries the video feed as well as telemetry data and other advanced flight controls. The DDS can use very well-known detection methods to detect these networks. Like how any wireless device, such as a cell phone, scans and detects all visible networks in the area, the DDS can implement a standard Wi-Fi® card to detect networks as well. From this basic information, the system can check the MAC address of the device broadcasting the network and compare the first three octets to a known list of manufacturer Organizationally Unique Identifier (OUI). If this OUI is a match to a UAS manufacturer, then the system can use this information and identify how many clients are operating in the network. For the networks that do not contain UAS specific manufacturers, then it is also possible to detect high traffic and evaluate the likelihood of a video feed operating within a network. Other characteristics of the network may also be used for the system to deem the network as a rogue threat.

Once the system classifies a threat, then it will attempt to locate the devices by using standard triangulation and already commercially available locationing services. If the network is found to be in the restricted airspace, then the system can initiate defenses such as, but not limited to notifying the customer, beginning a deauthentication attack against rogue clients and/or access points within legal limits, tracking the movements of the rogue systems, or some other action.

What is claimed is:

1. A method of detecting an unnamed aerial system (UAS), the method comprising the steps of:
    detecting, via a transceiver, a signal stream, wherein the signal stream contains one or more wireless transmissions from one or more sources, and wherein the signal stream includes one or more communications between the one or more sources;
    filtering, via a processor, the signal stream to create a filtered stream; and
    classifying, via the processor, the filtered stream based on features associated with the filtered stream as a known UAS stream or a potential UAS or other wireless communications stream or a combination thereof, wherein the features include a periodic time, a dwell time, a power, a modulation type, and a channel space associated with the filtered stream.

2. The method of claim 1, wherein if the known stream matches at least one previously obtained signal stream, and wherein the potential UAS stream is compared to a number of criteria in order to verify the signal is an unknown UAS stream.

3. The method of claim 1 further comprising the step of:
    tracking, via the processor, the known stream of the UAS, wherein the tracking is performed by mapping at least a portion of a hopping sequence attributable to the UAS.

4. The method of claim 1 further comprising the step of:
    executing, via the processor, at least one command causing a response in the UAS.

* * * * *